(12) United States Patent
Nakamura

(10) Patent No.: US 10,237,453 B2
(45) Date of Patent: Mar. 19, 2019

(54) VIDEO PROCESSING APPARATUS, CONTROL METHOD, AND EFFECT SWITCHER

(71) Applicant: SONY CORPORATION, Minato-ku (JP)

(72) Inventor: Sensaburo Nakamura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 322 days.

(21) Appl. No.: 14/492,659

(22) Filed: Sep. 22, 2014

(65) Prior Publication Data

US 2015/0116595 A1 Apr. 30, 2015

(30) Foreign Application Priority Data

Oct. 25, 2013 (JP) .................................. 2013-221893

(51) Int. Cl.
*H04N 9/45* (2006.01)
*H04N 5/073* (2006.01)
*H04N 5/268* (2006.01)
*H04N 21/61* (2011.01)
*H04N 21/433* (2011.01)
*H04N 21/438* (2011.01)

(52) U.S. Cl.
CPC .......... *H04N 5/0736* (2013.01); *H04N 5/268* (2013.01); *H04N 9/45* (2013.01); *H04N 21/4331* (2013.01); *H04N 21/4384* (2013.01); *H04N 21/6106* (2013.01)

(58) Field of Classification Search
CPC .......................................................... H04N 9/45
USPC .................................................... 348/523, 36
See application file for complete search history.

(56) References Cited

U.S. PATENT DOCUMENTS

| 4,742,350 A * | 5/1988 | Ko ............................. G09G 5/42 345/539 |
| 2012/0098925 A1* | 4/2012 | Dasher .................... H04N 5/247 348/36 |

* cited by examiner

*Primary Examiner* — Jefferey F Harold
*Assistant Examiner* — Sihar A Karwan
(74) *Attorney, Agent, or Firm* — Oblon, McClelland, Maier & Neustadt, L.L.P.

(57) ABSTRACT

There is provided a video processing apparatus that includes a network interface, first and second video buffering sections, a video supply section, a video control section, and a command issue section. The two video buffering sections are configured to receive and store video data coming in packets over a network via the network interface. The video supply section is configured to supply a video signal to a video signal line, the video signal being a selected output from one of the first and second video buffering sections. The video control section is configured to execute control over the other components. The command issue section is configured to send a bus input change command to the video control section as an instruction for video data selection for supply to the video signal line, the bus input change command including information about identifying a video data supply source connected over the network.

14 Claims, 18 Drawing Sheets

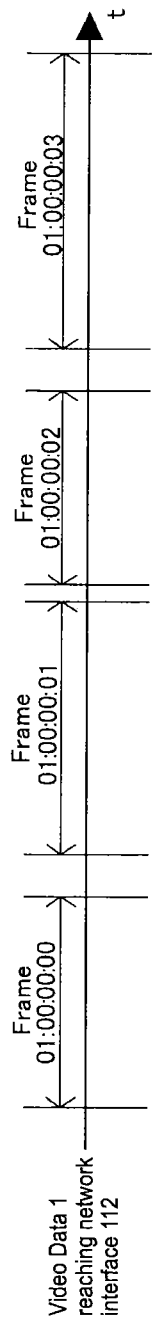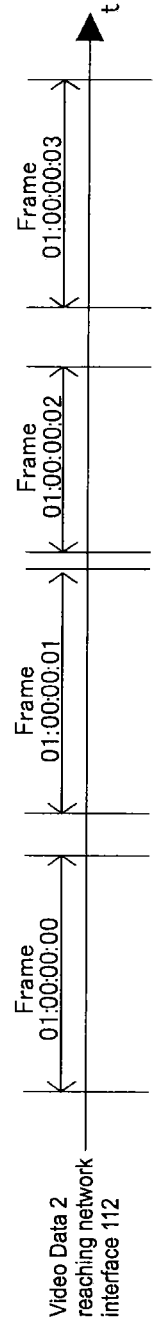

| Sequence : Exemplary items for control over Switcher |
|---|
| 1 | A Bus Xpt =1; B Bus Xpt =3; Key 1 Xpt =9; Key 1 On; |
| 2 | A Bus Xpt =1; B Bus Xpt =3; TransType =Wipe ; Wipe =15; AutoTrans |
| 3 | A Bus Xpt =2; Key 1 Off ; Key 2 Xpt =11; Key 2 On |
| 4 | B Bus Xpt =4; TransType =Wipe ; Wipe =12; AutoTrans |

FIG.14

| Sequence : Exemplary items for control over Switcher | | |
|---|---|---|
| Number | Control over Switcher | A Bus TimeCode (Time difference) |
| 1 | A Bus Xpt=1; B Bus Xpt=3; Key1 Xpt=9; Key1 On; | Starting point is T_Start |
| 2 | A Bus Xpt=1; B Bus Xpt=3; TransType=Wipe; Wipe=15; AutoTrans | T_Start + 00:00:05:00 |
| 3 | Key1 Off; Key2 Xpt=11; Key2 On | T_Start + 00:00:12:00 |
| 4 | B Bus Xpt=4; TransType=Wipe; Wipe=12; AutoTrans | T_Start + 00:02:10:12 |

FIG.17

| Sequence : Exemplary items for control over Switcher | | | |
|---|---|---|---|
| Number | Control over Switcher | Specification of Bus | Bus Video TimeCode (Absolute value) |
| 1 | A Bus Xpt=1; B Bus Xpt=3; Key1 Xpt=9; Key1 On; | A | 01:00:05:00 |
| 2 | A Bus Xpt=1; B Bus Xpt=3; TransType=Wipe; Wipe=15; AutoTrans | A | 01:00:20:00 |
| 3 | Key1 Off; Key2 Xpt=11; Key2 On | B | 01:00:40:00 |
| 4 | B Bus Xpt=4; TransType=Wipe; Wipe=12; AutoTrans | Key2 | 01:02:10:12 |

| Correspondence table between Xpt numbers and video signal sources |
|---|
| 1   video1.area1.domain1.com |
| 2   video2.area1.domain1.com |
| 3   video3.area1.domain1.com |
| 4   SDI IN1 |
| 5   SDI IN3 |
| ... |

FIG.19B

| Correspondence table between Xpt numbers and video signal sources |
|---|
| 1   user1@video1.area1.domain1.com |
| 2   user1@video2.area1.domain1.com |
| 3   user2@video2.area1.domain1.com |
| 4   SDI IN1 |
| ... |

FIG.19C

| Correspondence table between Xpt numbers and video signal sources |
|---|
| 1   video1.area1.domain1.com:/dev/vout0 |
| 2   video2.area1.domain1.com:/dev/vout0 |
| 3   video2.area1.domain1.com:/dev/vout2 |
| 4   SDI IN1 |
| ... |

| Correspondence table between Xpt numbers and display names |
|---|
| 1   VTR1 |
| 2   VTR2 |
| 3   CAM2 |
| ... |

FIG.20

VIDEO PROCESSING APPARATUS, CONTROL METHOD, AND EFFECT SWITCHER

CROSS REFERENCE TO RELATED APPLICATIONS

This application claims the benefit of Japanese Priority Patent Application JP 2013-221893 filed Oct. 25, 2013, the entire contents of which are incorporated herein by reference.

BACKGROUND

The present technology relates to video processing apparatuses, control methods, and effect switchers and, more specifically, to a video processing apparatus and others that obtain video data over a network for supply to a predetermined video signal line exemplified by an effect switcher.

At the time of program production and broadcasting, a device called effect switcher is used to create special effects on images, e.g., changing images, adding subtitles over images by keying, or placing a subscreen(s) on a part of a screen. For example, Japanese Patent Application Laid-Open No. 2010-103960 describes an exemplary effect switcher.

Transferring video data over a network has been performed. For example, Japanese Patent Application Laid-Open No. 2013-058986 describes about capturing video data by a plurality of cameras, and sending the video data to a camera receiver over a network.

SUMMARY

It is thus desirable to achieve a smooth supply of video data to a predetermined video signal line exemplified by an effect switcher after obtaining the video data over a network.

According to an embodiment of the present technology, there is provided a video processing apparatus, including: a network interface; a first video buffering section and a second video buffering section each configured to receive and store video data coming in packets over a network via the network interface; a video supply section configured to supply a video signal to a video signal line, the video signal being a selected output from one of the first video buffering section and the second video buffering section; a video control section configured to execute control over the other components; and a command issue section configured to send a bus input change command to the video control section as an instruction for video data selection for supply to the video signal line, the bus input change command including information about identifying a video data supply source connected over the network, the video control section being configured to, when receiving the bus input change command in a state that the output from the first video buffering section is being selected by the video supply section, send a packet transmission request to the video data supply source that is connected over the network and identified by the bus input change command and change the video data being received by the second video buffering section to the video data instructed by the bus input change command, and cause, after detecting that the video data stored in the second video buffering section exceeds a predetermined amount, the video supply section to select the output from the second video buffering section at an image frame or field boundary in the video data being the output from the first video buffering section and cause the video supply section to supply the video data stored in the second video buffering section to the video signal line at the image frame or field boundary therein.

In the embodiment of the present technology, the two video buffering sections each receive and store video data coming in packets over the network via the network interface. The video supply section selects an output of one of the two video buffering sections, and supplies the output as a video signal to a video signal line. The video control section controls the other components. The video control section is provided with a bus input change command from a command issue section as an instruction for video data selection for supply to the video signal line. The bus input change command includes information about identifying a video data supply source connected over the network.

When the bus input change command is received in a state that the output from the first video buffering section is being selected by the video supply section, the video control section sends a packet transmission request to the network-connected video data supply source identified by the bus input change command, and changes the video data being received by the second video buffering section to the video data instructed by the bus input change command.

Thereafter, after detecting that the video data stored in the second video buffering section exceeds a predetermined amount, the video control section causes the video supply section to select the output from the second video buffering section at an image frame or field boundary in the video data being the output from the first video buffering section, and causes the video supply section to supply the video data stored in the second video buffering section to the video signal line at the image frame or field boundary therein.

As described above, according to the embodiment of the present technology, for a change of video data, at an image frame or field boundary in video data currently output from one of the video buffering sections, video data stored in the other of the video buffering sections is started to be supplied to the video signal line at an image frame or field boundary therein. This accordingly prevents a loss of synchronization at the time of a change of video data, thereby achieving smooth supply of video data to the video signal line.

Further, according to the embodiment of the present technology, a change of video data is performed after the video data stored in the second video buffering section is detected as exceeding a predetermined amount. That is, the change of video data is performed after the video data becomes available from the second video buffering section. Therefore, video data not yet ready with no signal input is not selected for the change of video data.

In the embodiment of the present technology, the video control section may be configured to send, when the change of video data instructed by the received bus input change command is completed for supply to the video signal line, a notification of completion of bus input change to the command issue section. If this is the case, the command issue section may be configured to indicate, when the notification of completion of bus input change is provided by the video control section, that the change of video data is completed.

Also if this is the case, the video processing apparatus may further include a trigger input section, and the command issue section may have a function of issuing the bus input change command every time accepting a trigger from the trigger input section in accordance with a sequence programmed in advance, and may be configured to accept, after issuing the bus input change command during the sequence, the next trigger in response to receiving the notification of completion of bus input change.

Also if this is the case, the command issue section may have a function of issuing the bus input change command in a sequence, the sequence being programmed in advance or when to execute the bus input change command, and may be configured to issue, when receiving the notification of completion of bus input change after issuing the bus input change command during the sequence, another input bus change command for the sequence at a time specified by the sequence, the time being known by counting an elapsed time from an operation time, the operation time being at the completion of the change of video data.

Also in the embodiment of the present technology, as an example, the video processing apparatus may further include a plurality of video selection sections each including the first video buffering section and the second video buffering section, and the video supply section, in which when receiving the bus input change command from the command issue section instructing a predetermined number of the video selection sections to operate for the change of video data all at once, the video control section is configured to cause, at the image frame or field boundary in the video data being the output from the first video buffering section, the predetermined number of the video selection sections to supply all at once the video data stored in the second video buffering section to the respective video signal lines at the image frame or field boundary therein.

According to another embodiment of the present technology, there is also provided a video processing apparatus, including: a network interface; a first video buffering section and a second video buffering section each configured to receive and store video data coming in packets over a network via the network interface; a video supply section configured to supply a video signal to a video signal line, the video signal being a selected output from one of the first video buffering section and the second video buffering section; a video control section configured to execute control over the other components; and a command issue section configured to send a bus input change command to the video control section as an instruction for video data selection for supply to the video signal line, the bus input change command including information about identifying a video data supply source connected over the network, the command issue section having a function of issuing the bus input change command in a sequence programmed in advance on when to execute the bus input command, the video control section being configured to identify, in a state that the output from the first video buffering section is being selected by the video supply section, which video data is to be supplied to the video signal line by the video supply section after a current time in the sequence, send a packet transmission request to the video data supply source that is connected over the network and identified by the bus input change command and change the video data being received by the second video buffering section to the identified video data, and cause, when receiving the bus input change command instructed by the command issue section to select the identified video data, the video supply section to select the output from the second video buffering section at an image frame or field boundary in the video data being the output from the first video buffering section and cause the video supply section to supply the identified video data stored in the second video buffering section to the video signal line at the image frame or field boundary therein.

In the embodiment of the present technology, the two video buffering sections each receive and store video data coming in packets over the network via the network interface. The video supply section selects an output of one of the two video buffering sections, and supplies the output as a video signal to a video signal line. The video control section controls the other components. The video control section is provided with a bus input change command from a command issue section as an instruction for video data selection for supply to the video signal line. The bus input change command includes information about identifying a video data supply source connected over the network.

The command issue section has a function of issuing the bus input change command in a sequence programmed in advance when to execute the bus input command. The video control section identifies, in a state that the output from the first video buffering section is being selected by the video supply section, which video data is to be supplied to the video signal line by the video supply section after a current time in the sequence. The video control section sends a packet transmission request to the network-connected video data supply source identified by the bus input change command, and changes the video data received by the second video buffering section to the identified video data.

When the bus input change command is received, the video control section causes the video supply section to select the output from the second video buffering section at an image frame or field boundary in the video data being the output from the first video buffering section, and causes the video supply section to supply the video data stored in the second video buffering section to the video signal line at the image frame or field boundary therein.

As described above, according to the embodiment of the present technology, for a change of video data, at an image frame or field boundary in video data currently output from one of the video buffering sections, video data stored in the other of the video buffering sections is started to be supplied to the video signal line at an image frame or field boundary therein. This accordingly prevents a loss of synchronization at the time of the change of video data, thereby achieving smooth supply of video data to the video signal line.

Further, according to the embodiment of the present technology, video data is identified for supply to the video signal line by the video supply section after a current time in the sequence, and the identified video data is stored in the second video buffering section. In this manner, a change of video data is performed promptly in response to an incoming bus input change command.

According to another embodiment of the present technology, there is also provided a video processing apparatus, including: a network interface; a first video buffering section and a second video buffering section each configured to receive and store video data coming in packets over a network via the network interface; a video supply section configured to supply a video signal to a video signal line, the video signal being a selected output from one of the first video buffering section and the second video buffering section; a video control section configured to execute control over the other components; and a command issue section configured to send a bus input change command with time information to the video control section as an instruction for video data selection for supply to the video signal line, the bus input change command including information about identifying a video data supply source connected over the network, the time information specifying an image frame or field for executing the bus input change, the video control section being configured to, when receiving the bus input change command in a state that the output from the first video buffering section is being selected by the video supply section, send a packet transmission request to the video data supply source that is connected over the network and identified by the bus input change command and change the video data being received by the second video buffering section to the video data instructed by the bus input change command, and cause, after receiving a trigger for bus input change or after detecting that a time specified by the bus input chance command comes, the video supply section to select the output from the second video buffering section at an image frame or field boundary in the video data being the output from the first video buffering section and cause the video supply section to supply the video data stored in the second video buffering section to the video signal line starting from the image frame or field at a time indicated by the time information.

In the embodiment of the present technology, the two video buffering sections each receive and store video data coming in packets over the network via the network interface. The video supply section selects an output of one of the two video buffering sections, and supplies the output as a video signal to a video signal line. The video control section controls the other components.

The video control section is provided with a bus input change command with time information from a command issue section as an instruction for video data selection for supply to the video signal line. The bus input change command includes information about identifying a video data supply source connected over the network, and the time information specifies an image frame or field for executing the bus input chancre.

When the bus input change command is received in a state that the output from the first video buffering section is being selected by the video supply section, the video control section sends a packet transmission request to the network-connected video data supply source identified by the bus input change command, and changes the video data being received by the second video buffering section to the video data instructed by the bus input change command.

Thereafter, the video control section causes, after receiving a trigger for bus input change or after detecting that it is a time specified by the bus input change command, the video supply section to select the video data being the output from the second video buffering section at an image frame or field boundary in the video data being the output from the first video buffering section, and causes the video supply section to supply the video data stored in the second video buffering section to the video signal line starting from the image frame or field at a time indicated by the time information. The time code attached to the video signal being supplied to the video signal line is used as a basis to know that it is the time specified by the bus input change command.

As described above, according to the embodiment of the present technology, for a change of video data, at an image frame or field boundary in video data currently output from one of the video buffering sections, video data stored in the other of the video buffering sections is started to be supplied to the video signal line at an image frame or field boundary therein. The image frame or field boundary is known by a time indicated in time information, which is attached to the bus input change command. This accordingly prevents a loss of synchronization at the time of the change of video data, thereby being able to achieve smooth supply of video data to the video signal line.

Further, according to the embodiment of the present technology, a change of video data is performed after a trigger for bus input change is received or after detection that a time specified by the bus input change command has come. That is, the change of video data is performed after the video data becomes available from the second video buffering section. Therefore, video data not yet ready with no signal input is not selected for a change of video data.

According to the embodiment of the present technology, video data obtained over a network is smoothly supplied to a predetermined video signal line exemplified by an effect switcher. While the effects have been described, the foregoing description is in all aspects illustrative and not restrictive. It is understood that other effects described in the Specification are also applicable.

These and other objects, features and advantages of the present technology will become more apparent in light of the following detailed description of best mode embodiments thereof, as illustrated in the accompanying drawings.

BRIEF DESCRIPTION OF DRAWINGS

FIGS. 4A and 4B are each a diagram showing, in video data coming in packets over a network, how each image frame data reaches a network interface of the effect switcher;

FIG. 14 is a diagram showing an exemplary sequence (program) for control over the effect switcher;

FIG. 17 is a diagram showing another exemplary sequence (program) for control over the effect switcher;

FIG. 18 is a diagram showing still another exemplary sequence (program) for control over the effect switcher;

FIGS. 19A to 19C are each a diagram showing an exemplary correspondence table between cross-point numbers and signal sources of video data;

FIG. 20 is a diagram showing an exemplary correspondence table between cross-point numbers and display names.

DETAILED DESCRIPTION OF EMBODIMENT

Hereinafter, an embodiment of the present technology (hereinafter, simply referred to as "embodiment") will be described with reference to the drawings. Note that the description is given in the following order.
1. Embodiment
2. Modified Example 1. Embodiment

[Configuration of Effect Switcher System]

Figure 1:
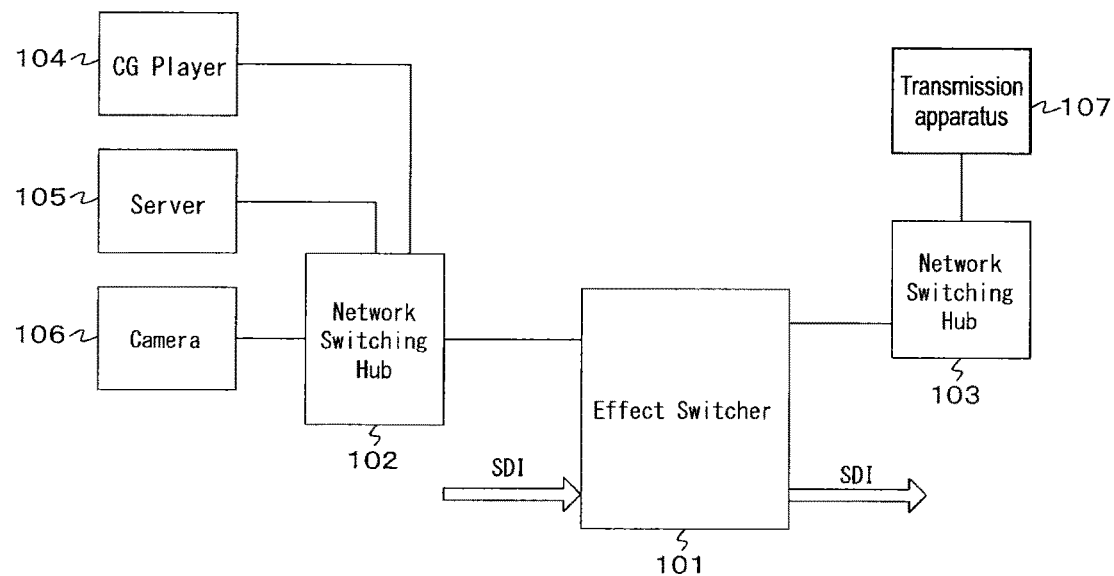
FIG. 1 is a block diagram showing an exemplary configuration of an effect switcher system as an embodiment of the present technology.

FIG. 1 shows an exemplary configuration of an effect switcher system 10 as an embodiment of the present technology. This effect switcher system 10 includes an effect switcher 101, and network switching hubs 102 and 103. The effect switcher 101 includes a network interface, and is connected to an external device that is connected to a network via the network switching hub(s). This configuration allows transmission of video data in packets between the effect switcher 101 and the external device.

The external device being a supply source of video data is exemplified by a CG (Computer Graphics) player 104, a video clip server 105, and a camera 106 for use of imaging during live performances. In the example of FIG. 1, these components, i.e., the CG player 104, the server 105, and the camera 106, are connected to the effect switcher 101 via the network switching hub 102.

The external device being a supply destination of video data is exemplified by a transmission apparatus 107 for broadcasting use. In the example of FIG. 1, this transmission apparatus 107 for broadcasting use is connected to the effect switcher 101 via the network switching hub 103. Although not shown, alternatively, the effect switcher 101 may be connected with a server via the network switching hub 103. This configuration may allow recording of outputs from the effect switcher 101.

The effect switcher 101 includes an SDI (Serial Digital Interface). Through SDI connection, the effect switcher 101 receives video data from a video device, or transmits video data to the video device.

Figure 2:
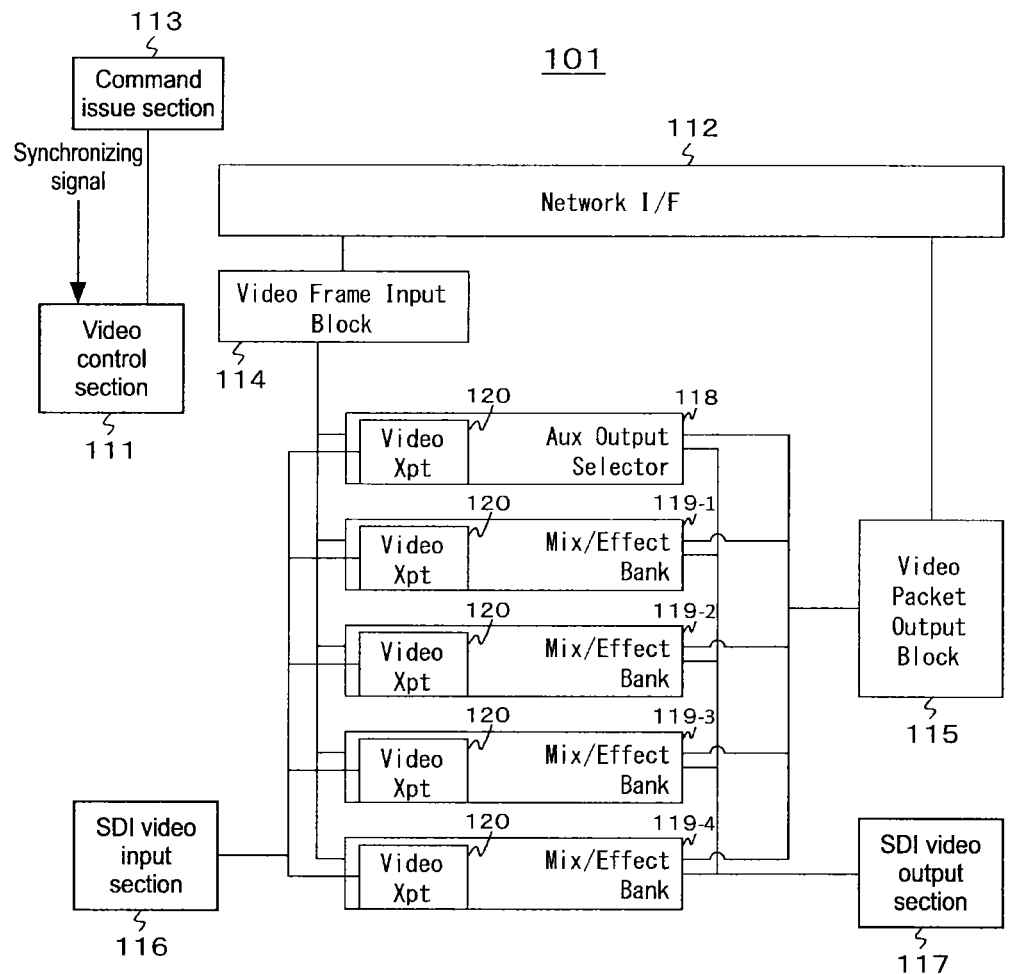
FIG. 2 is a block diagram showing an exemplary configuration of an effect switcher.

FIG. 2 shows an exemplary configuration of the effect switcher 101. The configuration in the example of FIG. 2 does not include communication lines or others in a control system. The effect switcher 101 includes a video control section 111, a network interface 112, a command issue section 113, a video frame input block 114, and a video packet output block 115. The effect switcher 101 also includes an SDI video input section 116, an SDI video output section 117, an auxiliary (AUX) output selector 118, and mixer/effect (M/E) banks 119-1 to 119-4.

The video control section 111 controls the components in the effect switcher 101. The network interface 112 transmits and receives video data over the network. Note that the video control section 111 also performs communication for control over an external device(s) via the network interface 112.

The command issue section 113 is connected with the video control section 111 via a communication line. The command issue section 113 includes a computer, and is provided with an operation input section exemplified by a push button switch for accepting an operator's operation.

In accordance with an operation input, the command issue section 113 refers to setting details and sequences in storage to transmit commands to the video control section 111.

The video frame input block 114 generates an internal video signal from video data. This video frame input block 114 supplies a video signal to each of a plurality of video signal lines. Although the details will be given later, the video frame input block 114 includes two video buffering sections, and a video supply section for each of the video signal lines. The video signals supplied to the video signal lines are each in synchronization with a synchronizing signal (vertical synchronizing signal), which is input to the video control section 111 or others from the outside. The video packet output block 115 transmits the internal-format video signals in packets over the network.

The SDI video input section 116 receives a plurality of SDI video signals from the outside, and converts the SDI video signals into internal-format video signals for supply to the video signal lines inside. These video signals are each in synchronization with a synchronizing signal (vertical synchronizing signal), which is input to the video control section 111 or others from the outside.

The SDI video output section 117 converts the internal-format video signals into SDI signals, and then outputs the resulting SDI signals. The SDI video input section 116 and the SDI video output section 117 configure a serial digital interface (SDI).

The AUX output selector 118 receives a plurality of video signals from the video frame input block 114, and also receives a plurality of video signals from the SDI video input section 116. The AUX output selector 118 outputs these video signals to the video packet output block 115 and the SDI video output section 117, respectively.

This AUX output selector 118 includes a video cross-point section 120, and supplies the video signals selected respectively to the lines for output of video signals in accordance with a command about which video signal is for which video signal line. Although not shown, this AUX output selector 118 includes hardware for each of the lines for output of video signals for use of video signal adjustment, e.g., chroma control.

The M/E banks 119-1 to 119-4 receive a plurality of video signals from the video frame input block 114, and receive a plurality of video signals from the SDI video input section 116. The M/E banks 119-1 to 119-4 output the video signals respectively to the video packet output block 115 and the SDI video output section 117. These M/E banks 119-1 to 119-4 each include a video cross-point section 120. This video cross-point section 120 follows a command about which of the received video signals is for which of the internal video signal lines, and accordingly supplies the video signals to the video signal lines.

Figure 3:
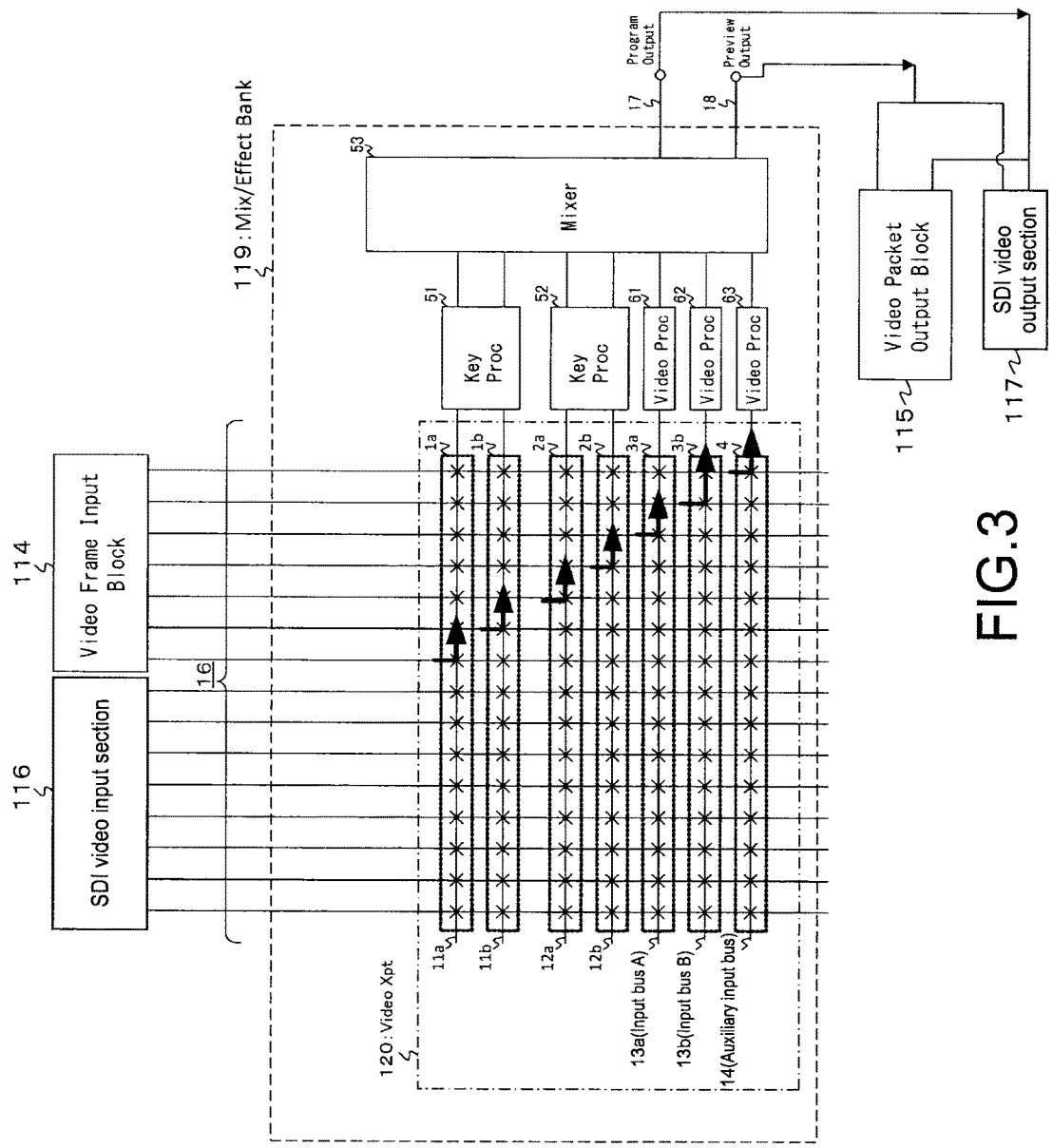
FIG. 3 is a diagram showing an exemplary configuration of a Mix/Effect bank.

FIG. 3 shows an exemplary configuration of the M/E bank 119 (any of 119-1 to 119-4). This M/E bank 119 includes the video cross-point section 120, key processors (key processing circuits) 51 and 52, a mixer (image synthesis section) 53, video processors (video processing sections) 61 to 63, and video signal lines each indicated by a line in FIG. 3.

The M/E bank 119 is a component for mixing of video images, and adding effects on the video images. For mixing of video images, the video images are expected to be in the same phase at the time of processing. Being in the same phase means the video images being in the same phase among the video signal lines.

The video cross-point section 120 makes a selection from a plurality of input video signal lines 16 for a supply of video signal to each of a plurality of buses (video signal lines). As to the input video signal lines 16, some are extended from the SDI video input section 116, and some are extended from the video frame input block 114. In the example of FIG. 3, the video cross-point section 120 connects the input video signal lines 16 to key source buses 11*a* and 12*a*, key fill buses 11*b* and 12*b*, an input bus A (background A bus) 13*a*, an input bus B (background B bus) 13*b*, and an auxiliary input bus 14, respectively.

Note that a cross-point (Xpt) originally denotes a selection switch that selects a crossing point from those of a plurality of signal lines. In this Specification, the expression of cross-point (Xpt) denotes not only physical crossing of signal lines but also a function of making a selection of signal sources from which video data comes in packets. Herein, the signal sources are those regarded as input video signal lines.

There is a key source selection switch 1*a* between each of the input video signal lines 16 and the key source bus 11*a*, and a key source selection switch 2*a* between each of the input video signal lines 16 and the key source bus 12*a*. These key source selection switches 1*a* and 2*a* are each provided for selecting a key source signal from a plurality of image signals coming over the input video signal lines 16. Moreover, there is a key fill selection switch 1*b* between each of the input video signal lines 16 and the key fill bus 11*b*, and a key fill selection switch 2*b* between each of the input video signal lines 16 and the key fill bus 12*b*. These key fill selection switches 1*b* and 2*b* are each provided for selecting a key fill signal from a plurality of image signals coming over the input video signal lines 16.

The key source signals taken out to the key source buses 11*a* and 12*a* after being selected by the key source selection switches 1*a* and 2*a* are sent to the key processors 51 and 52, respectively. The key fill signals taken out to the key fill buses 11*b* and 12*b* after being selected by the key fill selection switches 1*b* and 2*b* are also sent to the key processors 51 and 52, respectively. Herein, the key fill signals are signals of an image for overlay on a background image as a foreground. The key source signals are for specifying where to overlay the image of the key fill signals, which shape the background image is to be cut out, and what density the key fill signals are to be with respect to the background image, for example.

A background A selection switch 3*a* is provided between each of the input video signal lines 16 and the input bus A (background A bus) 13*a* for selecting a background A signal from a plurality of image signals coming over the input video signal lines 16. A background B selection switch 3*b* is provided between each of the input video signal lines 16 and the input bus B (background B bus 13*b*) for selecting a background B signal from a plurality of image signals coming over the input video signal lines 16. An auxiliary input selection switch 4 is provided between each of the input video signal lines 16 and the auxiliary input bus 14 for selecting an auxiliary input signal from a plurality of image signals coming over the input video signal lines 16.

The background A signal taken out to the input bus A (background A bus) 13*a* after being selected by the background A selection switch 3*a* is sent to the mixer 53 via the video processor 61. The background B signal taken out to the input bus B (background B bus) 13*b* after being selected by the background B selection switch 3*b* is sent to the mixer 53 via the video processor 62. The auxiliary input signal taken out to the auxiliary input bus 14 after being selected by the auxiliary input selection switch 4 is sent to the mixer 53 via the video processor 63.

The key processors 51 and 52 are each a circuit for adjustment and processing of the key fill signals and the key source signals to make the signals suitable for keying. Such adjustment and processing are performed based on key adjustment values, which are various parameters for keying. The key adjustment values are for density adjustment of key fill signals with respect to a background image, for adjustment of signal level threshold of an image that is to be discriminated as key source signals, for position adjustment of key source signals, for adjustment of reduction ratio with key fill signals, for adjustment of boundary with a background image, and others.

The key fill signals and the key source signals done with adjustment and processing by the key processors 51 and 52 are sent to the mixer 53. The mixer 53 is a circuit that uses the key fill signals and the key source signals from the key processors 51 and 52 to overlay a foreground image on a background image by keying.

The mixer 53 is capable of creating a wipe effect or others when generating a background image by combining the background A signal via the video processor 61 and the background B signal via the video processor 62, i.e., the mixer has 53 a function of background image transition by the wipe effect or others. The mixer 53 outputs a plurality of video signals as appropriate to the function.

In the example of FIG. 3, a program output is output to the outside over a program output line 17, and a preview output is output to the outside over a preview output line 18. The program output is a video signal itself to be sent out during live broadcasting. The preview output is a video signal that is not sent out for broadcasting use but is used by an operator to check how a video image looks.

FIGS. 4A and 4B are each a diagram showing how each image frame data, i.e., information equivalent to a piece of bitmap, reaches the network interface 112 in the effect switcher 101 (refer to FIG. 2). Herein, the image frame data is in video data coming over a network in packets. FIG. 4A shows when Video Data 1 being a piece of video data comes in packets, and FIG. 4B shows when Video Data 2 being another piece of video data comes also in packets. The video data 1 and 2 are on the same time axis.

Packet transmission of video data is not quite so uniform, and thus the frame data comes at different times.

There thus is expected to include a buffer for accommodating such differences in transmission time, and to read the incoming video data without interruption from the buffer with some delay in between. The resulting video signals generated from the video data are thus in synchronization with an internal synchronizing signal.

As shown in FIGS. 4A and 4B, when a plurality of pieces of video data are coming in packets, the buffer is expected to accommodate differences in transmission time for each of the video data. The effect switcher 101 is assumed to be used in a system defining the largest possible difference in transmission time for every incoming video data. This helps to determine in advance the minimum size for the buffer for use.

As an example, when the difference in transmission time is two frames, i.e., $2/30$ seconds when video data includes 30 frames per second, the buffer for use is expected to be available for two frames plus alpha, i.e., two frames plus the maximum data processing time. Moreover, for internal signal generation in synchronization with a synchronizing signal, the buffer is expected to be available also for an additional frame or field. The buffer is thus expected to be ready for three frames plus alpha, for example.

For a change of video data coming in packets from one to another for supply to an internal video signal line, such a buffer is expected to be ready for each of the video data, and the two buffers are operated alternately in synchronization with an internal synchronizing signal.

Figure 5:
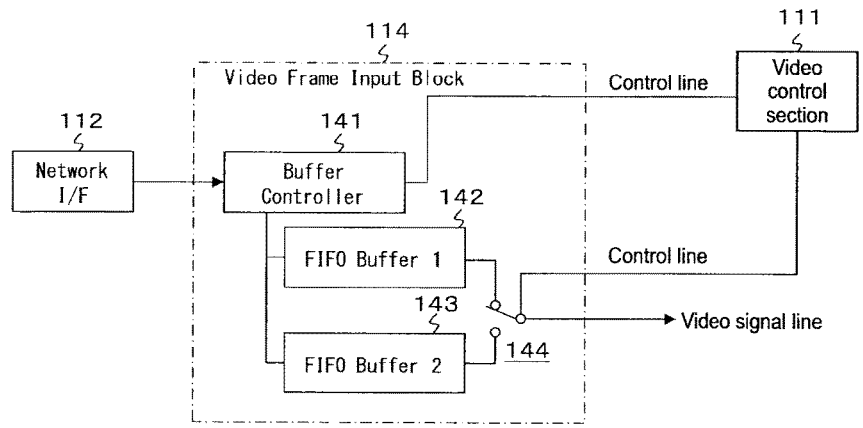
FIG. 5 is a diagram showing an exemplary configuration of a video frame input block.

FIG. 5 shows an exemplary configuration of the video frame input block 114 for the alternate use of the buffers. The video frame input block 114 includes a buffer controller 141, two FIFO (First-In First-Out) buffers 142 and 143, and a switch section 144. The FIFO buffers 142 and 143 each configure a video buffering section, and the switch section 144 configures a video supply section.

These components in the video frame input block 114 are under the control of the video control section 111, and operate in synchronization with a synchronizing signal as appropriate. The buffer controller 141 controls the FIFO buffers 142 and 143. From packets of video data provided from the network interface 112, the buffer controller 141 extracts only the video data, and writes the video data into the FIFO buffer 142 or 143. This writing may be performed without interruption to both of the buffers.

The FIFO buffers 142 and 143 are in the same configuration, and operate to alternate their functions. The switch section 144 is shown as a simple switch, but reads data from the FIFO buffer 142 or 143, and converts the data into video signals for output. The FIFO buffers 142 and 143 each automatically discard any old data when the amount of data written thereinto exceeds the possible capacity thereof, i.e., when reaching a limit because accumulation of data therein is faster than reading of data therefrom for output. This discarding of data is performed on a frame basis.

Described now is the operation of the video frame input block 114 of FIG. 5. When a piece of video data is received in packets with no alternating process of buffers, and when the video data is supplied to a video signal line, e.g., input bus A, only one of the FIFO buffers is used, and the remaining FIFO buffer is not used.

The network interface 112 receives video data in packets from a target of communication previously designated by the video control section 111, i.e., other device on the network. The video image data extracted from the packets is intermittently written into one of the FIFO buffers by the buffer controller 141. The switch section 144 then reads the video data from the FIFO buffer in synchronization with an internal synchronizing signal. The video data is converted into the internal-format video signals for intermittent supply to the video signal line.

Described next is the operation for a change of video data from the current one to another provided from a different supply source, i.e., transmission source of packets on the network, for supply to a video signal line.

The video control section 111 requests the supply source to start packet transmission of video data. In response to the request, the packet transmission is started, and when the packets reach the network interface 112, the packets are passed to the buffer controller 141. The buffer controller 141 then starts writing of video image data extracted from the packets to the remaining FIFO buffer that is not used.

When the amount of data accumulated in the remaining FIFO buffer exceeds a predetermined value, e.g., three frames, the video data becomes available for reading from the FIFO buffer. Once the video data becomes available for reading, the switch section 144 is allowed to read the video data at an arbitrary time from the FIFO buffer, and to supply the video data in the form of internal video signals without interruption to the video signal line.

When to read and supply the video data as above is depending on the control by the video control section 111.

Herein, a change of the FIFO buffers for reading of the video data is performed at a frame or field boundary in synchronization with an internal vertical synchronizing signal. That is, when reading of a specific frame is completed from one of the FIFO buffers, the switching section 144 starts reading of another frame at the head from the remaining FIFO buffer. The data read as above is output one by one in the form of video signals.

Note that even if the amount of data accumulated in the remaining FIFO buffer exceeds a predetermined value, e.g., three frames, the data is not read but is kept accumulated unless the switch section 144 becomes ready for reading of the data. However, the FIFO buffer is limited in size for data accumulation, and thus the data accumulation does not continue forever.

When data written into the FIFO buffer exceeds the capacity thereof, even if no data reading is performed, discarding of data is automatically started in the order in which the data was accumulated. Reading of data is performed on an image frame basis without fail, and is not started within an image frame (sometimes within a field). Therefore, discarding of data is performed on an image frame basis. As the FIFO function, the data disappears from the buffer as is read therefrom.

In FIG. 3 referred to in the above, the video signal lines extended from the video frame input block 114 for output of video signals have a one-to-one relationship with the buses extended from the WE bank 119. In FIG. 3, each one of the video signal lines and each one of the buses are connected together by a cross point. The video frame input block 114 includes two FIFO buffers for each of the video signal lines as shown in FIG. 5.

As an alternative configuration, a plurality of FIFO buffers in the video frame input block 114 may be shared by the video signal lines. If this is the configuration, the video supply section (switch section) is provided to each of the video signal lines extended from the video frame input block 114 for output of video signals.

In this configuration, when the buffer controller 141 starts writing of video data in response to new packets coming from an external supply source, the video control section 111 finds any empty FIFO buffer from those in the configuration before allowing the writing. By such a change of buffer, the FIFO buffer not used any more for supply to the lines for output of video signals is released for management purpose, and is made empty.

In this configuration, when a plurality of video signal lines (buses) for one or more of the WE banks 119 use the same video data, a plurality of video supply sections (switch sections) may share the FIFO buffer being in charge of writing of video data provided in packets. In this case, a plurality of video supply sections read the video data from the FIFO buffer, and outputs the video data in the form of video signals. Alternatively, video signals may be supplied to a plurality of video signal lines that are branched from one video signal line. The FIFO buffer is released for management purpose and is made empty when it is done with every video supply section.

Figure 6:
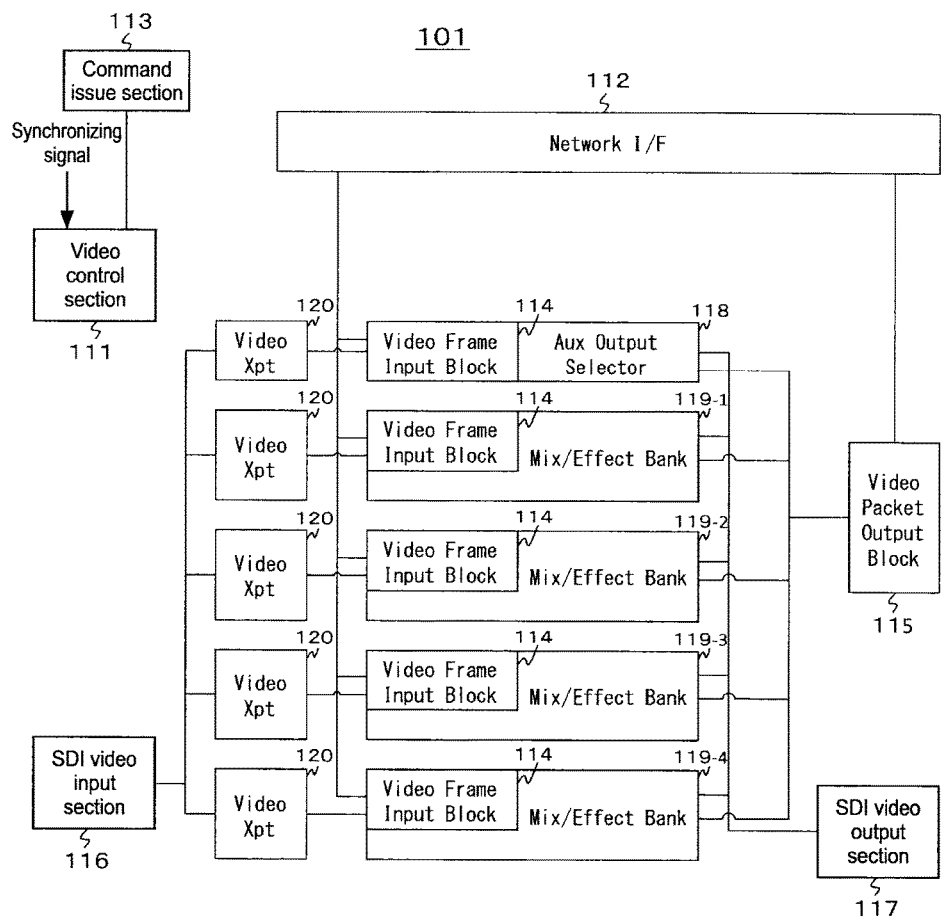
FIG. 6 is a block diagram showing another exemplary configuration of the effect switcher of FIG. 2.

FIG. 6 shows another exemplary configuration of the effect switcher 101. In FIG. 6, any component corresponding to that in FIG. 2 is provided with the same reference numeral, and is not described in detail again if appropriate. In this example, the video frame input block 114 is provided in each of the M/E banks 119 or others, or is provided to each of the M/E banks 119 or others. Such a configuration has advantages that the FIFO buffer in the video frame input block 114 may serve also as the memory for use by the M/E bank 119.

For digital image processing (pixel mapping) in the key processors 51 and 52 or in the mixer 53 of FIG. 3, the M/E bank 119 once writes image frames onto a memory. As the memory for such digital image processing, the FIFO buffer in the video frame input block 114 may be used because the FIFO buffer is for temporarily storing the image frames. This configuration saves the amount of memory and a period of time for reading and writing once from/to the memory, thereby being able to reduce a signal processing delay in the entire processing by the system.

Figure 7:
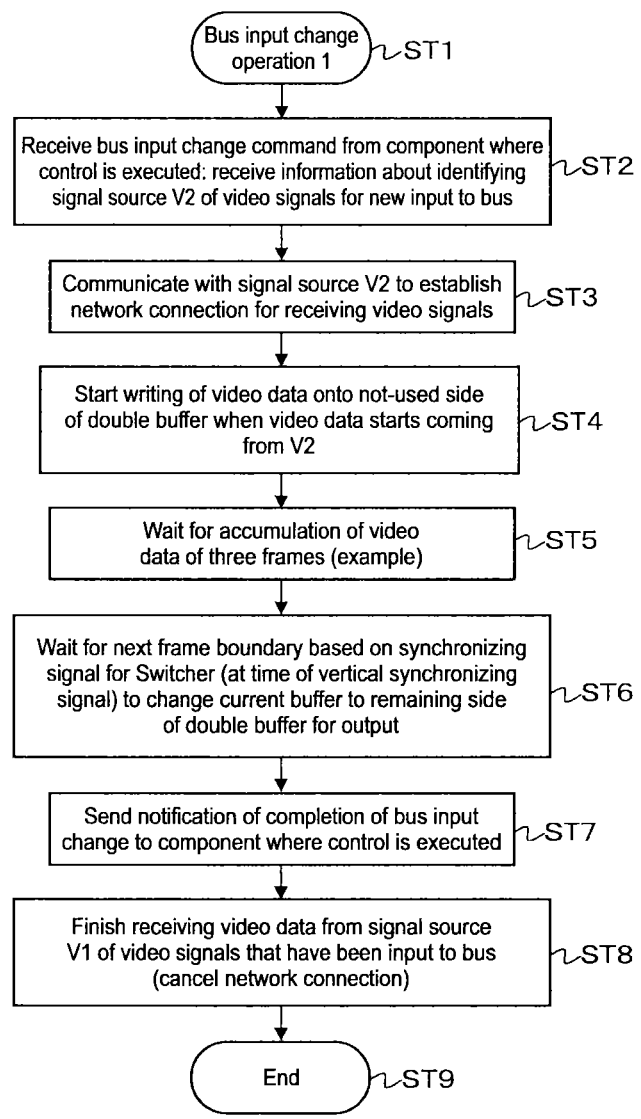
FIG. 7 is a flowchart showing an exemplary bus input change operation performed for control by a video control section.
Figure 8:
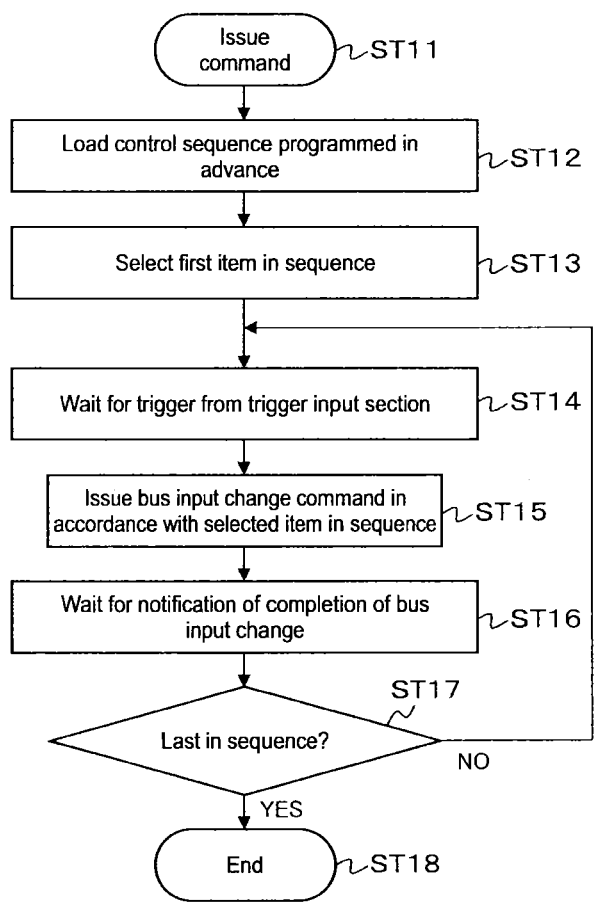
FIG. 8 is a flowchart of an exemplary command issue process performed by a command issue section.

The flowchart of FIG. 7 shows an exemplary bus input change operation performed for control by the video control section 111. In step ST1, the video control section 111 starts the procedure. In step ST2, the video control section 111 receives a bus input change command from the command issue section 113 where control is executed. With this bus input change command, the video control section 111 receives information about identifying a signal source V2 of video signals that are to be newly input to a bus.

Next, in step ST3, the video control section 111 communicates with the signal source V2 via the network interface 112, and establishes a network connection for receiving the video signals. Then in step ST4, when video data starts coming from the signal source V2, the video control section 111 starts writing of the video data onto the not-used side of a double buffer (two FIFO buffers).

Next, in step ST5, the video control section 111 waits until a predetermined amount of video data is accumulated, e.g., video data of three frames. When such data accumulation is detected, in step ST6, the video control section 111 changes the current buffer to the remaining of the double buffer for output of video data at the boundary of the next frame in response to a synchronizing signal for the effect switcher 101 (at a time of vertical synchronizing signal).

Next, in step ST7, the video control section 111 sends a notification of completion of bus input change to the command issue section 111 where control is executed. When receiving this notification of completion of bus input change, the command issue section 113 indicates that the change of video data is completed. For example, the command issue section 113 illuminates the portion of a crosspoint (Xpt) button on an operation console for the effect switcher 101 where a user operated.

Next, in step ST8, the video control section 111 finishes receiving the video data from a signal source V1 of video signals that have been input to the bus. That is, the video control section 111 cancels the network connection with the signal source V1. After the process in step ST8, in step ST9, the video control section 111 ends the procedure.

The flowchart of FIG. 3 shows an exemplary command issue process performed by the command issue section 113.

In step ST11, the command issue section 113 starts the procedure. In step ST12, the command issue section 113 loads a control sequence that is programmed in advance.

Next, in step ST13, the command issue section 113 selects a first item in the sequence. In step ST14, the command issues section 113 then waits for a trigger input by a user operating a trigger input section. This trigger input section specifically means an operation input section provided to the command issue section 113, e.g., push button switch, for accepting the operator's operation.

When there is a trigger input, in step ST15, the command issue section 113 issues a bus input change command in accordance with the selected item in the sequence. This bus input change command is sent to the video control section 111. In step ST16, the command issue section 113 waits for a notification of completion of bus input change from the video control section 111.

In step ST17, when receiving the notification of completion of bus input change from the video control section 111, the command issue section 113 determines whether or not the selected item is the last in the sequence. When the selected item is not the last in the sequence, the command issue section 113 selects the next item in the sequence. The procedure then returns to the process in step ST14, and the processes similar to that described above are repeated. On the other hand, when the selected item is the last in the sequence, in step ST18, the command issue section 113 ends the procedure.

Alternatively, after receiving the notification of completion of bus input change, the command issue section 113 may issue another bus input change command during the sequence not in response to a trigger input as described above but when the time specified by the sequence comes. The command issue section 113 knows when the time comes by counting the elapsed time from the operation time, which is when the change of video data is completed.

Figure 9:
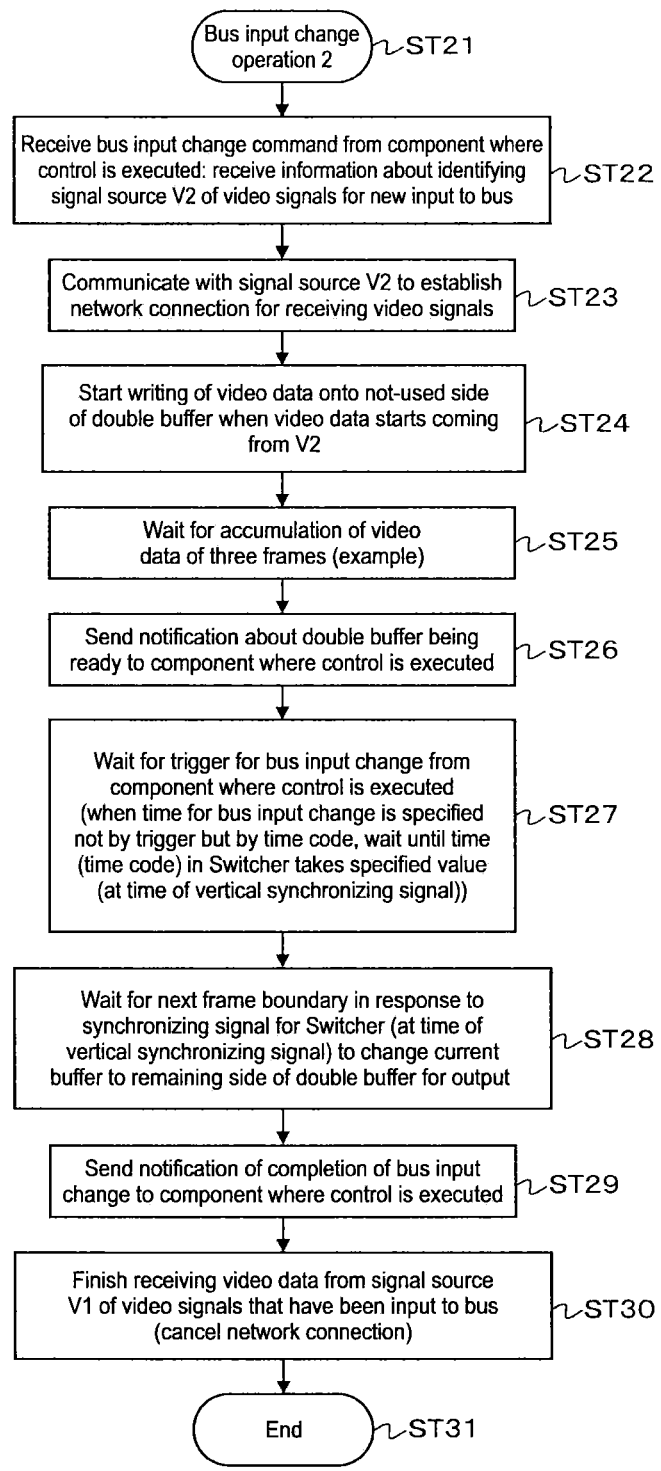
FIG. 9 is a flowchart showing another exemplary bus input change operation performed for control by the video control section.

The flowchart of FIG. 9 shows another exemplary bus input change operation performed for control by the video control section 111. In step ST21, the video control section 111 starts the procedure. In step ST22, the video control section 111 receives a bus input change command from the command issue section 113 where control is executed. With this bus input change command, the video control section 111 receives information about identifying a signal source V2 of video signals that are to be newly input to a bus.

Next, in step ST23, the video control section 111 communicates with the signal source V2 via the network interface 112, and establishes a network connection for receiving the video signals. Then in step ST24, when video data starts coming from the signal source V2, the video control section 111 starts writing of the video data onto the not-used side of a double buffer (two FIFO buffers).

Next, in step ST25, the video control section 111 waits until a predetermined amount of video data is accumulated, e.g., video data of three frames. When such data accumulation is detected, in step ST26, the video control section 111 sends a notification about the double buffer being ready to the command issue section 111 where control is executed.

Next, in step ST27, the video control section 111 waits for a trigger for bus input change from the command issue section 113 where control is executed. When the time for a bus input change is specified not by the trigger but by a time code (time information), the video control section 111 waits for a vertical synchronizing signal with which the time (time code) in the effect switcher 101 takes a value specified by the bus input chance command.

When the trigger for bus input change is provided by the command issue section 113, or at the time specified by the time code, in step ST28, the video control section 111 changes the current buffer to the remaining side of the double buffer for output of video data at the boundary of the next frame in response to the synchronizing signal for the effect switcher 101 (at a time of vertical synchronizing signal).

Next, in step ST29, the video control section 111 sends a notification of completion of bus input change to the command issue section 111 where control is executed. When receiving this notification of completion of bus input change, the command issue section 113 indicates that the change of video data is completed. For example, the command issue section 111 illuminates the portion of a cross-point (Xpt) button on an operation console for the effect switcher 101 where a user operated.

Next, in step ST30, the video control section 111 finishes receiving the video data from a signal source V1 of video signals that have been input to the bus. That is, the video control section 111 cancels the network connection with the signal source V1. After the process in step ST30, in step ST31, the video control section 111 ends the procedure.

Figure 10:
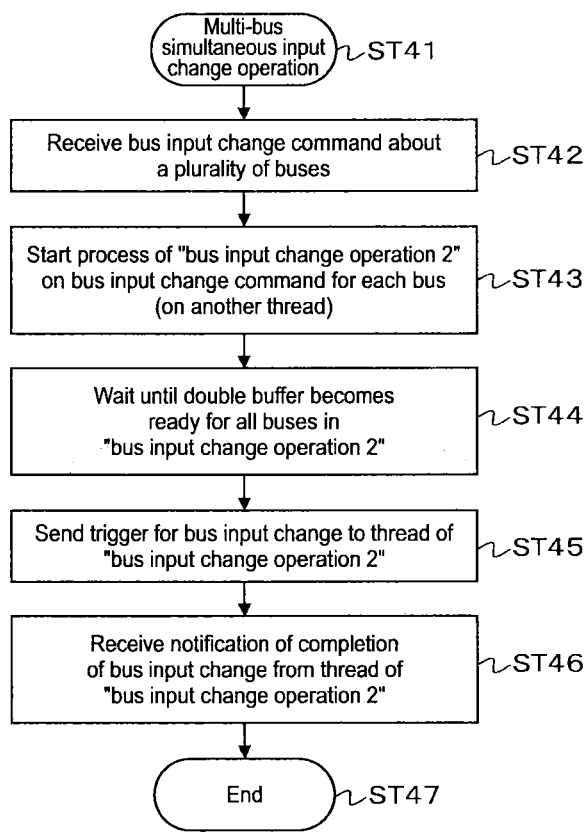
FIG. 10 is a flowchart showing an exemplary multi-bus simultaneous input change operation performed for control by the video control section.

The flowchart of FIG. 10 shows an exemplary multi-bus simultaneous input change operation performed for control by the video control section 111. In step ST41, the video control section 111 starts the procedure. In step ST42, the video control section 111 receives a bus input change command about a plurality of buses from the command issue section 113 where control is executed.

Next, in step ST43, the video control section 111 starts a process on the bus input change command, i.e., "bus input change operation 2", for each of the buses on another thread (refer to FIG. 9). Then in step ST44, the video control section 111 waits until the double buffer becomes ready (until a predetermined amount of video data is accumulated) in the thread of "bus input change operation 2" for all of the buses.

Next, when a predetermined amount of new video data is accumulated for each of the buses, in step ST45, the video control section 111 sends a trigger for bus input change to the thread of "bus input change operation 2". Then in step ST46, the video control section 111 receives a notification of completion of bus input change from the thread of "bus input change operation 2". After the process in step ST46, in step ST47, the video control section 111 ends the procedure.

Figure 11:
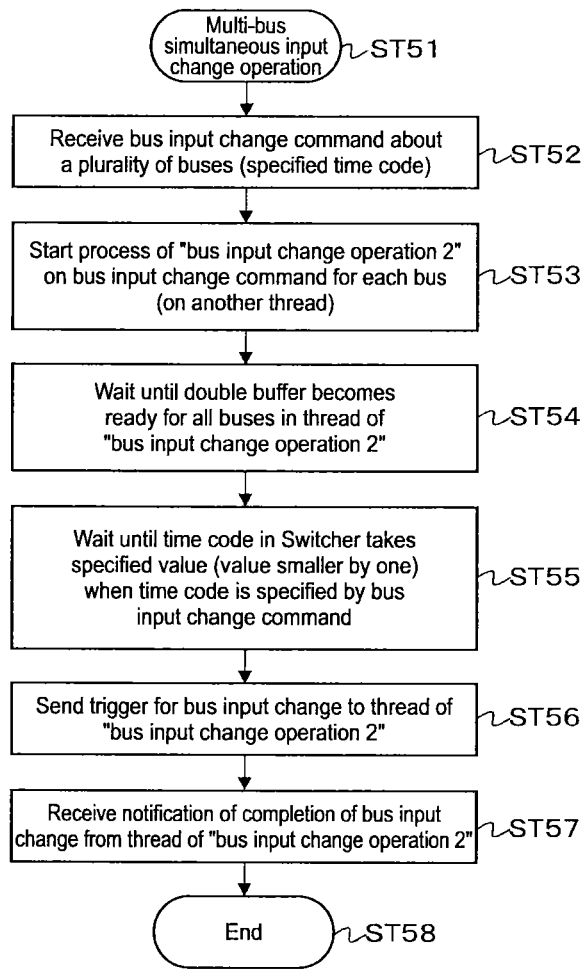
FIG. 11 is a flowchart showing another exemplary multi-bus simultaneous input change operation performed for control by the video control section.

The flowchart of FIG. 11 shows another exemplary multi-bus simultaneous input change operation performed for control by the video control section 111. In step ST51, the video control section 111 starts the procedure.

In step ST52, the video control section 111 receives a bus input change command about a plurality of buses from the command issue section 113 where control is executed.

Next, in step ST53, the video control section 111 starts the procedure on the bus input change command, i.e., "bus input change operation 2", for each of the buses on another thread (refer to FIG. 9). Then in step S54, the video control section 111 waits until the double buffer becomes ready (until a predetermined amount of video data is accumulated) in the thread of "bus input change operation 2" for all of the buses.

Next, after the double buffer becomes ready for all of the buses, when a time code is specified by the bus input change command, in step ST55, the video control section 111 waits until the time code in the effect switcher 101 takes a specified value (a value smaller by one than the specified value).

After the process in step ST55, in step ST56, the video control section 111 sends a trigger for bus input change to the thread of "bus input change operation 2". Then in step ST57, the video control section 111 receives a notification of completion of bus input change from the thread of "bus input change operation 2". After the process in step ST57, in step ST58, the video control section 111 ends the procedure.

Figure 12:
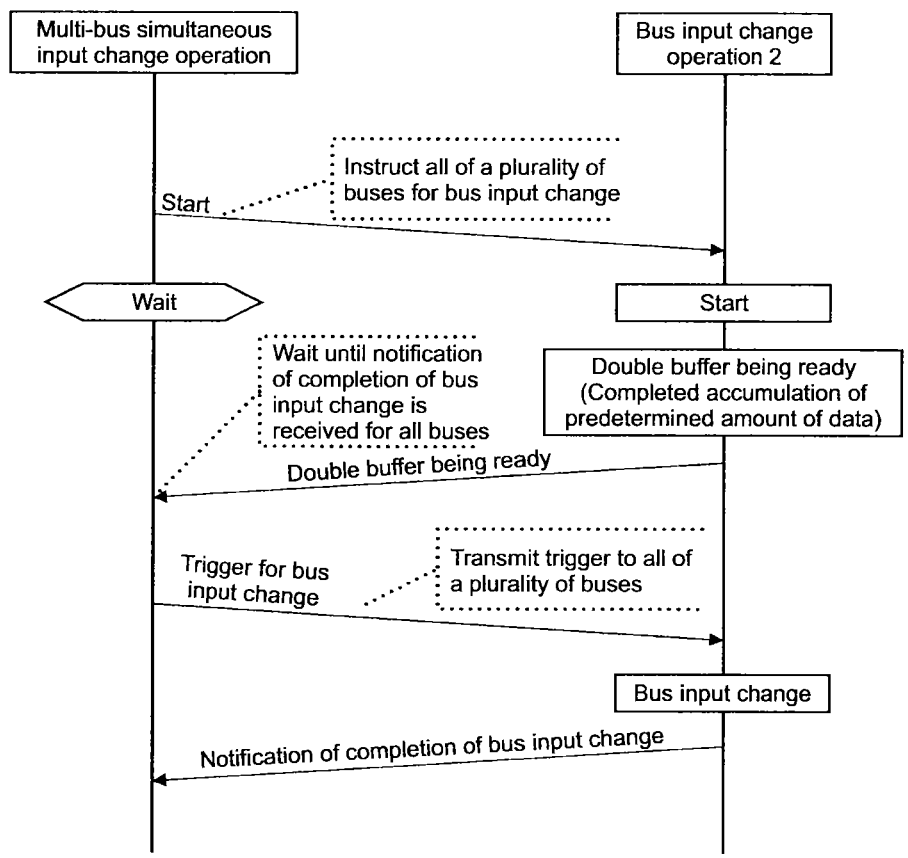
FIG. 12 is a diagram showing a process-to-process communication sequence during the multi-bus simultaneous input change operation.

The diagram of FIG. 12 shows a process-to-process communication sequence during the multi-bus simultaneous input change operation described above by referring to FIGS. 10 and 11. Herein, the expression of "wait" in the "multi-bus simultaneous input change operation" means to wait for a double buffer to be ready for all of the buses in the operation of FIG. 11, and when a time code is specified, means to wait for the time code to take a specified value.

Figure 13:
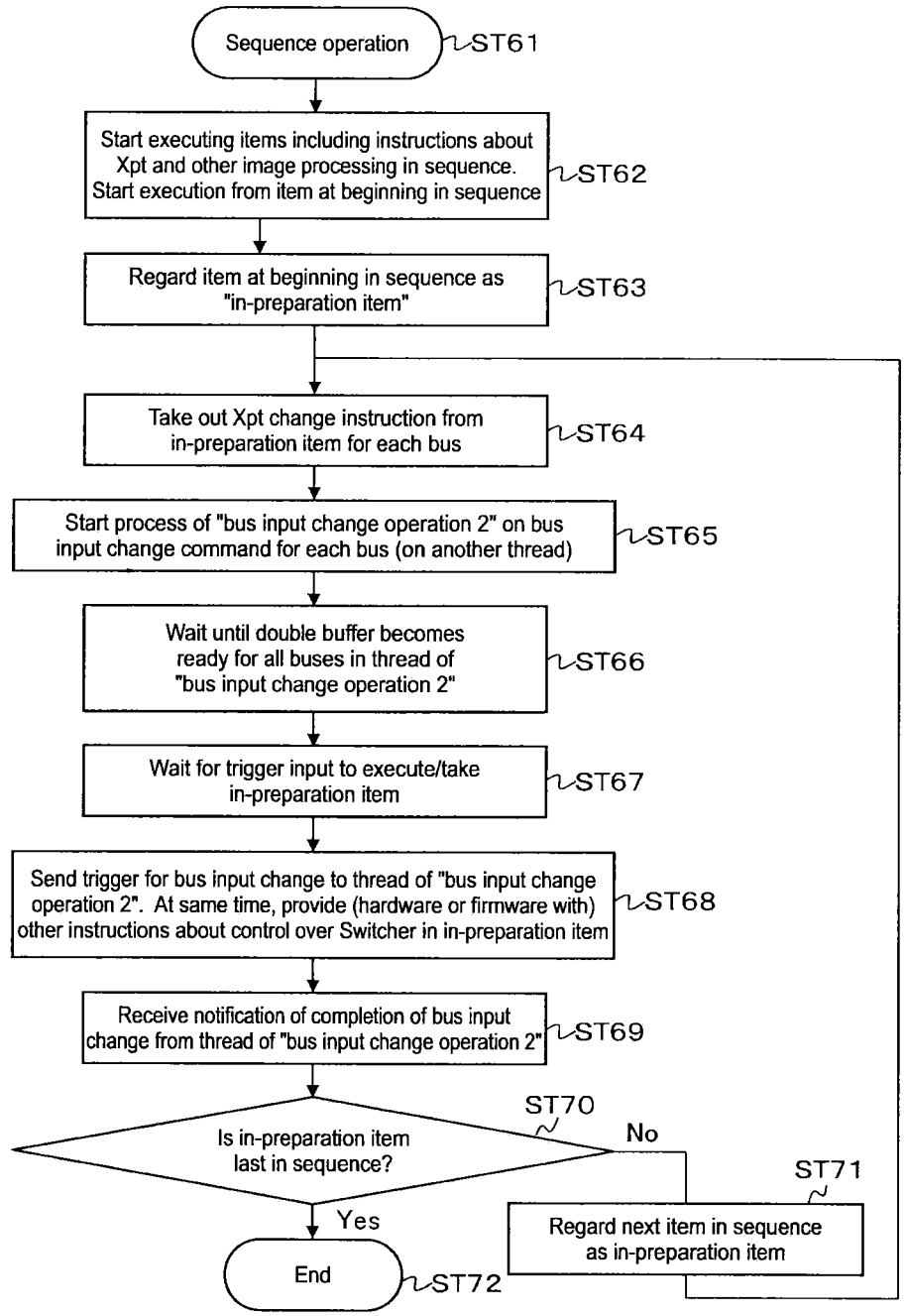
FIG. 13 is a flowchart showing an exemplary sequence operation performed by the video control section for control over the effect switcher.

The flowchart of FIG. 13 shows an exemplary sequence operation (procedure of steps in response to a trigger input in a sequence prepared in advance) performed by the video control section 111 for control over the effect switcher 101. In step ST61, the video control section 111 starts the procedure. Then in step ST62, the video control section 111 starts executing, in sequence, items about cross-point (Xpt) and those about other image processing. In this case, the video control section 111 starts from the item at the beginning in the sequence.

Next, in step ST63, the video control section 111 regards the item at the beginning in the sequence as "in-preparation item". In step ST64, from the in-preparation item, the video control section 111 takes out an instruction about cross-point change for each of the buses. Then in step ST65, the video control section 111 starts a process on a bus input change command, i.e., "bus input change operation 2", for each of the buses on another thread (refer to FIG. 9).

Next, in step ST66, the video control section 111 waits until a double buffer becomes ready for all of the buses in the thread of "bus input change operation 2". When the double buffer becomes ready for all of the buses, in step ST67, the video control section 111 waits for a trigger input by the user operating an operation input section to execute/take the in-preparation item.

When there is a trigger input, in step ST68, the video control section 111 sends a trigger for bus input change to the thread of "bus input change operation 2". At the same time, the video control section 111 provides hardware or firmware with instructions for any other control over the effect switcher in the in-preparation item. Then in step ST69, the video control section 111 receives a notification of completion of bus input change from the thread of "bus input change operation 2".

Next, in step ST70, the video control section 111 determines whether or not the in-preparation item is the last in the sequence. When the in-preparation item is not the last in the sequence, in step ST71, the video control section 111 regards the next item in the sequence as "in-preparation item". The procedure then returns to step ST64, and the processes similar to that described above are repeated. On the other hand, when the in-preparation item is the last in the sequence, in step ST72, the video control section 111 ends the procedure.

FIG. 14 is a diagram showing an exemplary sequence (program) for control over the effect switcher 101 as described above. FIG. 14 shows four exemplary items of operational state (control instructions) for the effect switcher 101.

In the sequence, the item of "1" describes to execute control to assign a cross-point (Xpt) number of 1 to the cross-point (Xpt) of an A Bus, assign a cross-point (Xpt) number of 3 to the cross-point (Xpt) of a B Bus, assign a cross-point (Xpt) number of 9 to the cross-point (Xpt) of a Key 1, and turn ON the Key 1.

In the sequence, the item of "2" describes to execute control to assign the cross-point (Xpt) number of 1 to the cross-point (Xpt) of the A Bus, assign the cross-point (Xpt) number of 3 to the cross-point (Xpt) of the B Bus, change a Transition Type to Wipe, and perform Auto Transition with a Wipe number of 15. Herein, the expression of "Auto Transition" means that the state transition during image processing is automatically performed without the use of a lever.

In the sequence, the item of "3" describes to execute control to assign the cross-point (Xpt) number of 2 to the cross-point (Xpt) of the A Bus, turn OFF the Key 1, assign the cross-point (Xpt) number of 11 to the cross-point (Xpt) of a Key 2, and turn ON a Key 2.

In the sequence, the item of "4" describes to execute control to assign the cross-point (Xpt) number of 4 to the cross-point (Xpt) of the B Bus, change the Transition Type to Wipe, and perform Auto Transition with a Wipe number of 12.

When each of the items describes to execute control over a plurality of cross-points (Xpt), the video frame input block 114 makes a buffer change at the same time as a bus input change affecting the output of the effect switcher 101.

Alternatively, in addition to the sequence, the effect switcher 101 may be manually operated during control execution as described in the items. If this is the case, the effect switcher 101 may be operated to be in the state not specified by the sequence, but the sequence may be executed to control thereover as described in the items irrespective of in what state the effect switcher 101 is. The result of manual operation may be overwritten with the description in the items.

The sequence of FIG. 14 does not describe when to execute control as is described in the items. This is because the time for control execution in each of the items is assumed to be manually input as is shown in the flowchart of FIG. 13. Herein, as shown in the flowchart of FIG. 13, the item subsequent to the current item done with control execution is the "in-preparation item", and for the item, video data to be provided to the video frame input block 114 is made ready without waiting for a trigger input, i.e., so-called prefetch control is executed.

Figure 15:
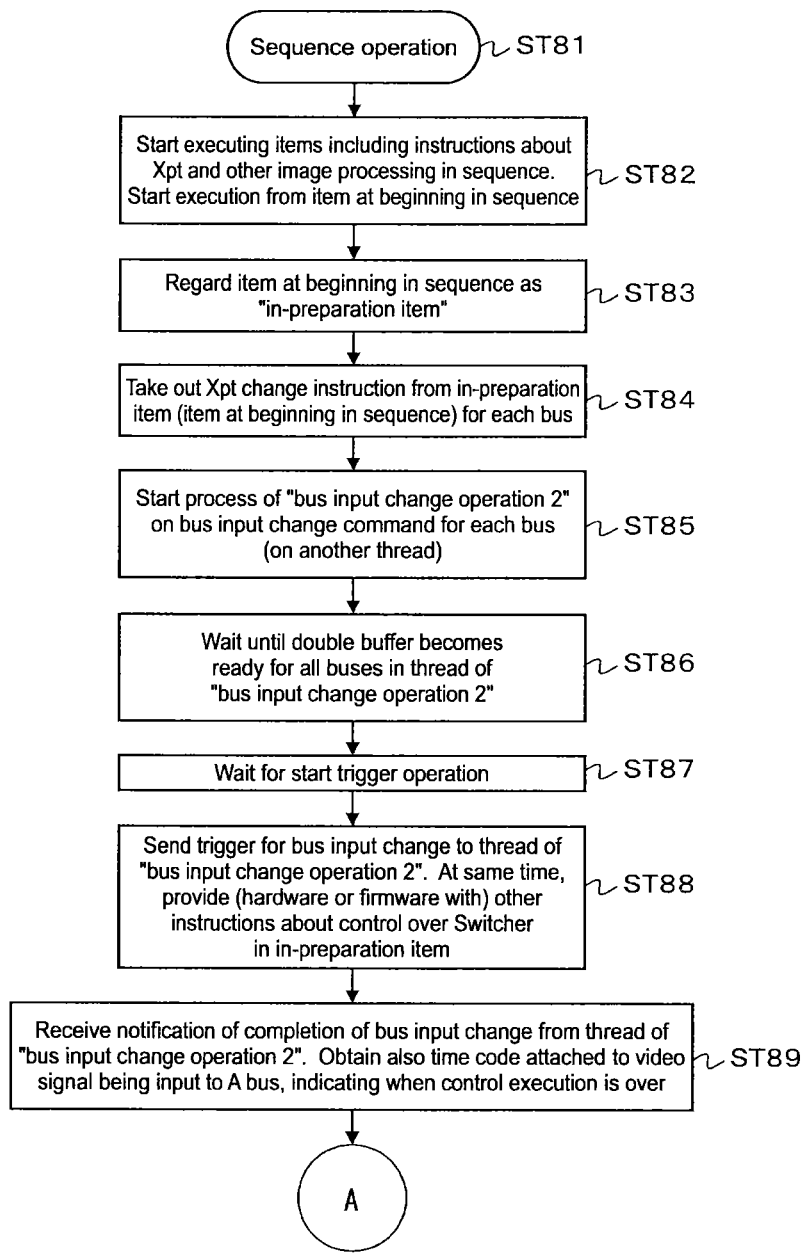
FIG. 15 is a flowchart showing another exemplary sequence operation performed by the video control section for control over the effect switcher.
Figure 16:
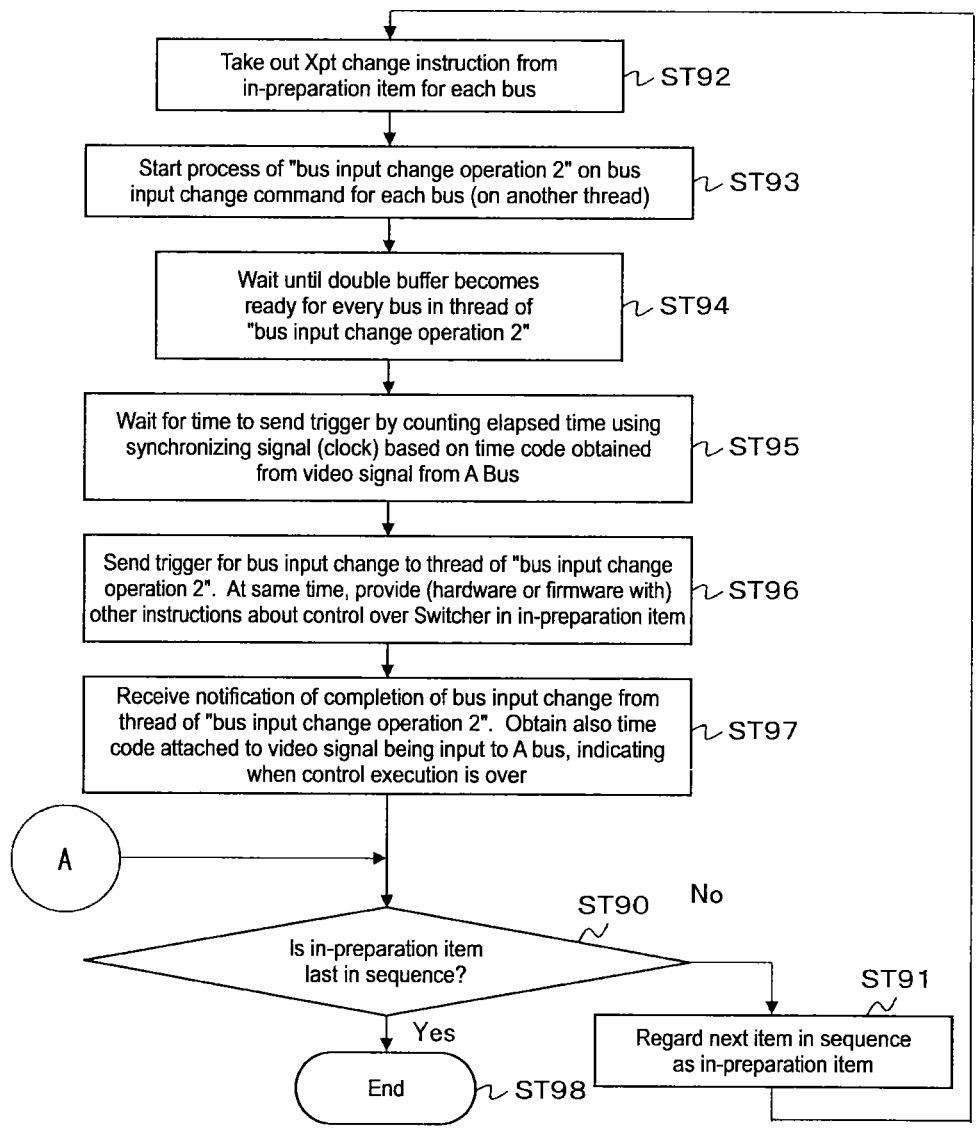
FIG. 16 is a flowchart showing still another exemplary sequence operation performed by the video control section for control over the effect switcher.

The flowcharts of FIGS. 15 and 16 each show another exemplary sequence operation (procedure of steps in response to a trigger input) performed by the video control section 111 for control over the effect switcher 101. In step ST81, the video control section 111 starts the procedure. Then in step ST82, the video control section 111 starts executing, in sequence, items about cross-point (Xpt) and those about other image processing.

In this case, the video control section 111 starts from the item at the beginning in the sequence.

Next, in step ST83, the video control section 111 regards the item at the beginning in the sequence as "in-preparation item". In step ST84, from the in-preparation item, the video control section 111 takes out an instruction about cross-point change for each of the buses. Then in step ST85, the video control section 111 starts a process on a bus input change command, i.e., "bus input change operation 2", for each of the buses on another thread (refer to FIG. 9).

Next, in step ST86, the video control section 111 waits until the double buffer becomes ready for each of the buses in the thread of "bus input change operation 2".

When the double buffer is ready for all of the buses, in step ST87, the video control section 111 waits for a trigger input by a user operating an operation input section.

When there is a trigger input to start the operation, in step ST88, the video control section 111 sends a trigger for bus input change to the thread of "bus input change operation 2". At the same time, the video control section 111 provides hardware or firmware with instructions for any other control over the effect switcher in the in-preparation item. Then in step ST89, the video control section 111 receives a notification of completion of bus input change from the thread of "bus input change operation 2". The video control section 111 also obtains a time code, which is generated when control execution is completed and is attached to a video signal being input to a predetermined video signal line, i.e., the input bus A (A Bus) in this example.

Next, in step ST90, the video control section 111 determines whether or not the in-preparation item is the last in the sequence. When the in-preparation item is not the last in the sequence, in step ST91, the video control section 111 regards the next item in the sequence as "in-preparation item". The procedure then goes to the process in step ST92.

In step ST92, from the in-preparation item, the video control section 111 takes out an instruction about cross-point change for each of the buses. Then in step ST93, the video control section 111 starts a process on the bus input change command, i.e., "bus input change operation 2", for each of the buses on another thread (refer to FIG. 9).

Next, in step ST94, the video control section 111 waits until the double buffer becomes ready for each of the buses in the thread of "bus input change operation 2".

When the double buffer is ready for all of the buses, in step ST95, the video control section 111 waits for a time for a trigger to send. The video control section 111 knows the time by counting the elapsed time using a synchronizing signal (clock) based on the time code already obtained from the video signal provided over the input bus A (A Bus).

When the time comes for sending a trigger, in step ST96, the video control section 111 sends a trigger for bus input change to the thread of "bus input change operation 2". At the same time, the video control section 111 provides hardware or firmware with instructions for any other control over the effect switcher in the in-preparation item. Then in step ST97, the video control section 111 receives a notification of completion of bus input change from the thread of "bus input change operation 2". The video control section 111 also obtains a time code attached to a video signal being input to the input bus A (A Bus), indicating when control execution is over.

Next, in step ST90, the video control section 111 determines whether or not the in-preparation item is the last in the sequence. When the in-preparation item is not the last in the sequence, in step ST91, the video control section 111 regards the next item in the sequence as "in-preparation item". The procedure then goes to step ST92, and the processes similar to those described above are repeated. On the other hand, when the in-preparation item is the last in the sequence, in step ST98, the video control section 111 ends the procedure.

FIG. 17 is a diagram showing an exemplary sequence (program) for control over the effect switcher 101 as described above. FIG. 17 shows four exemplary items of operational state (control instruction) for the effect switcher 101. The sequence in this example is similar to that of FIG. 14 described above except that each item includes a time for control execution.

In this example, the items except for the item of "1" each include a time for control execution, i.e., difference in time from the starting time (T_Start). The sequence is first started in response to an operator making an operation input, but after the item of "2", the time elapsed since the start of sequence is determined based on a time code attached to a video signal being input to the input bus A (A Bus) (refer to step ST95 in FIG. 16). In this case, when the time difference from the starting time (T_Start) known by the time code takes a value specified in each of the items, a trigger for bus input change is sent to the thread of "bus input change operation 2" (refer to step ST96 in FIG. 16).

Note that, in the exemplary sequence of FIG. 17, the time difference is written using the SMPTE timecode.

FIG. 18 shows an exemplary sequence (program) for control over the effect switcher 101 with items each including a time for control execution similarly to the exemplary sequence of FIG. 17. In this example, the time for control execution in each of the items is all specified by an absolute time code, and the items each describe which bus in the effect switcher 101 is providing the video signal including the time code in use as a basis. As an example, the item of "1" describes that control is to be executed when the time code attached to the video signal being input to the input bus A (A Bus) indicates "01:00:05:00".

FIG. 19A is a diagram showing an exemplary correspondence table between the cross-point numbers and the signal sources of video data. This correspondence table is stored in the video control section 111. This correspondence table is available for editing by an operator through the command issue section 113 or any other user interface section, for example.

The cross-point (Xpt) numbers are assigned to cross-point (Xpt) buttons arranged on an operation console for the effect switcher 101, for example. When any of these buttons is pushed for operation, the video control section 111 issues a control instruction using the cross-point number assigned thereto as an instruction parameter.

In the example of FIG. 19A, the cross-point (Xpt) numbers are each assigned to a host name (Fully Qualified Domain Name) for identifying a signal source. That is, the correspondence table in the example of FIG. 19A is for a case where specifying a host name on the network uniquely identifies video data, i.e., the signal source.

By referring to the flowcharts or others in this Specification, described is the operation of selecting and changing video data coming in packets. This is not restrictive, and video signals being SDI inputs may also be selected for each of the buses. If this is the case, because video signals being SDI inputs are to be also selected, the correspondence table stores not the host names but SDI input numbers for correspondence with the cross-point (Xpt) numbers.

In the example of FIG. 19A, the correspondence between the cross-point (Xpt) number of "4" and the SDI input number of "1" is indicated by a special character string of "SDIIN1". Similarly, the correspondence between the cross-point (Xpt) number of "5" and the SDI input number of "3" is indicated by a special character string of "SDIIN3".

When the selected video signal is an SDI input, for example, an immediate bus input change is possible without control execution in advance as shown in the flowchart of FIG. 7, e.g., "wait until a predetermined amount of video data is accumulated". If a notification of completion of bus input change is expected as shown in the flowchart of FIG. 9, for example, the notification of completion is assumed to be provided immediately.

FIG. 19B is a diagram showing another exemplary correspondence table between the cross-point (Xpt) numbers and the signal sources of video data. In this example, the cross-point (Xpt) numbers are each assigned to a combination of a host name (Fully Qualified Domain Name) and an account name for use to identify a signal source. That is, the correspondence table in the example of FIG. 19B is for a case where specifying an account name in addition to a host name on the network uniquely identify video data, i.e., the signal source.

In this case, the device specified by the host name may be able to provide a plurality of pieces of video data, and the account name specifies which video data. Accordingly, even if the host being a supply source of video data on the network is able to provide a plurality of pieces of video data, one specific video data may be identified.

FIG. 19C is a diagram showing still another exemplary correspondence table between the cross-point (Xpt) numbers and the signal sources of video data. In this example, the cross-point (Xpt) numbers are each assigned to a combination of a host name (Fully Qualified Domain Name) and a device name for use to identify the signal source. That is, the correspondence table in the example of FIG. 19C is for a case where specifying a device name in addition to a host name on the network uniquely identifies video data, the signal source.

In this case, the device specified by the host name may be able to provide a plurality of pieces of video data, and the device name identifies which video data. This allows the use of, with no change, a table in each host being a supply source of video data on the network, i.e., the table keeping track of a plurality of pieces of video data under device names. Therefore, one specific video data is identified without using any additional correspondence table.

Such correspondence tables are surely not restrictive, and for a correspondence table between the cross-point (Xpt) numbers and the signal sources of video data, a combination of a host name (Fully Qualified Domain Name) and a port number may be also used.

FIG. 20 is a diagram showing an exemplary correspondence table between the cross-point (Xpt) numbers and display names. The operation console (the command issue section 113) includes this correspondence table. This correspondence table is referred to for displaying a display name with a correspondence with the cross-point (Xpt) operation button. If a known user interface section is provided, this correspondence table becomes available for editing by an operator.

Figure 21:
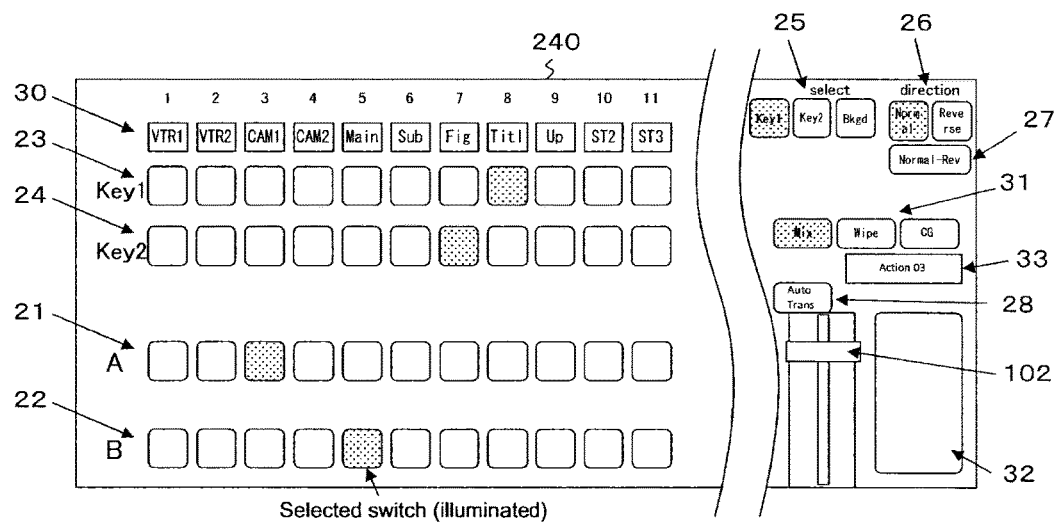
FIG. 21 is a diagram showing an exemplary external appearance (operation surface) of an operation console for the effect switcher.

FIG. 21 is a diagram showing an exemplary external appearance (operation surface) of an operation console 240 for the effect switcher 101. On the right end side of the operation console 240, there is a block (group of operation elements) for use with a transition operation for image synthesis and changing. A next transition selection button 25 determines which transition function is to be controlled by the block, i.e., determines whether the next transition is for a bus change (replacement) between A and B buses for a background image, or for turning ON or OFF any keyer.

The operation console 240 includes two types of keyers of Key1 and Key2. The number of types of keyers may surely be larger or smaller than two. Cross-point button lines 23 and 24 are used for an input image selection respectively for the Key1 and Key2 systems, for example. Cross-point button lines 21 and 22 are used for an input image selection for the A and B buses being background buses, for example. These cross-point button lines each have a function of operation control, e.g., when any of the buttons is pushed, an input signal (video) for the button is supplied to any appropriate bus.

A direction specifying button 26 accepts an operation of specifying a transition direction, i.e., Normal or Reverse, if a selection is possible. A normal-reverse (Normal-Rev) button 27 accepts an operation of alternating the transition direction between Normal and Reverse. A fader lever 102 is an operation element for manually controlling the progress of transition.

An automatic transition (AutoTrans) button 28 generates a trigger for instructing automatic transition, i.e., transition in proportion to time to achieve 100 within a predetermined period of time. A transition type selection button 31 is for a transition type selection. In this example, the transition type selection button 31 is operated to select any of Mix (overlaying entire screen for image synthesis at a parameter ratio), Wipe (dividing screen by a wipe pattern shape for image synthesis), and CG (overlaying CG image for image synthesis). A ten-key input section 32 is a group of buttons for input of numerical values, and is used to input wipe pattern numbers, for example.

The buttons may be each provided with a text display on the surface to allow function settings so that dynamic assignment of functions is possible, e.g., indicate functions on the display. A display 33 displays a Wipe number or a transition destination designated by operation. A source name display line 30 displays text information associated with index numbers of a matrix switch. The index numbers are respectively associated with numbers (cross-point numbers) of buttons disposed on the bottom (refer to FIG. 20). The text information is stored in a memory (not shown) in the switcher operation console 240, and is used by a user for setting of text information.

As described above, in the effect switcher system 10 of FIG. 1, for a change of video data for supply to a predetermined video signal line of the effect switcher 101 after being obtained over a network, at a frame or field boundary in video data coming from one of the video buffering sections, video data stored in the other video buffering section is started to be supplied to the video signal line at a frame or field boundary therein. This accordingly prevents a loss of synchronization at the time of the change of video data, thereby achieving smooth supply of video data obtained over a network to a predetermined video signal line of the effect switcher 101.

Also in the effect switcher system 10 of FIG. 1, at the time of a change of video data for supply to a predetermined video signal line of the effect switcher 101 after being obtained over a network, the change of video data is performed after the video data stored in one video buffering section is detected as exceeding a predetermined amount. That is, the change of video data is performed after the video data becomes available from the video buffering section. Therefore, video data not yet ready with no signal input is not selected for a change of video data.

2. Modified Example

Exemplified in the above embodiment is the case that the components in the video frame input block 114 for a video signal line (bus) of the effect switcher 101 are the buffer controller 141, and the two FIFO buffers 142 and 143 (refer to FIG. 5). Alternatively, these components may be three or more FIFO buffers. This allows control of obtaining in a sequence not only video data for the next use but also video data for use thereafter from signal sources on a network.

Also in the above embodiment, the present technology is applied to the input section in the effect switcher 101. This is surely not restrictive, and the present technology is applicable also to an input section for use when the state of synchronization is expected even if a change of video data is performed for supply to a predetermined video signal line after the video data is obtained over a network.

Moreover, exemplified in the above embodiment is the case of starting data reading for supply to a video signal line when data accumulated in a FIFO buffer exceeds a "predetermined amount". This "predetermined amount" may vary to be an appropriate value depending on the capabilities and condition of a network for connection in the present technology, and the performance of a device being a source of video data. In consideration thereof, the "predetermined amount" may be changed by setting operation of an operator considering the state of use, and may be stored in a control section.

The present technology may be also in the following structures.

(1) A video processing apparatus, including:
   a network interface;
   a first video buffering section and a second video buffering section each configured to receive and store video data coming in packets over a network via the network interface;
   a video supply section configured to supply a video signal to a video signal line, the video signal being a selected output from one of the first video buffering section and the second video buffering section;
   a video control section configured to execute control over the other components; and
   a command issue section configured to send a bus input change command to the video control section as an instruction for video data selection for supply to the video signal line, the bus input change command including information about identifying a video data supply source connected over the network,
   the video control section being configured to, when receiving the bus input change command in a state that the output from the first video buffering section is being selected by the video supply section,
      send a packet transmission request to the video data supply source that is connected over the network and identified by the bus input change command, and change the video data being received by the second video buffering section to the video data instructed by the bus input change command, and
      cause, after detecting that the video data stored in the second video buffering section exceeds a predetermined amount, the video supply section to select the output from the second video buffering section at an image frame or field boundary in the video data being the output from the first video buffering section, and cause the video supply section to supply the video data stored in the second video buffering section to the video signal line at the image frame or field boundary therein.

(2) The video processing apparatus according to (1), in which
   the video control section is configured to
   send, when the change of video data instructed by the received bus input change command is completed for supply to the video signal line, a notification of completion of bus input change to the command issue section.

(3) The video processing apparatus according to (2), in which
   the command issue section is configured to
   indicate, when the notification of completion of bus input change is provided by the video control section, that the change of video data is completed.

(4) The video processing apparatus according to (2) or (3), further including
   a trigger input section, in which
   the command issue section
   has a function of issuing the bus input change command every time accepting a trigger from the trigger input section in accordance with a sequence programmed in advance, and
   is configured to accept, after issuing the bus input change command during the sequence, the next trigger in response to receiving the notification of completion of bus input change.

(5) The video processing apparatus according to (2) or (3), in which the command issue section has a function of issuing the bus input change command in a sequence, the sequence being programmed in advance on when to execute the bus input change command, and is configured to issue, when receiving the notification of completion of bus input change after issuing the bus input change command during the sequence, another input bus change command for the sequence at a time specified by the sequence, the time being known by counting an elapsed time from an operation time, the operation time being at the completion of the change of video data.

(6) The video processing apparatus according to any one of (1) to (5), further including a plurality of video selection sections each including the first video buffering section and the second video buffering section, and the video supply section, in which when receiving the bus input change command from the command issue section instructing a predetermined number of the video selection sections to operate for the change of video data all at once, the video control section is configured to cause, at the image frame or field boundary in the video data being the output from the first video buffering section, the predetermined number of the video selection sections to supply all at once the video data stored in the second video buffering section to the respective video signal lines at the image frame or field boundary therein.

(7) A control method for a video processing apparatus including a network interface, a first video buffering section and a second video buffering section each configured to receive and store video data coming in packets over a network via the network interface, a video supply section configured to supply a video signal to a video signal line, the video signal being a selected output from one of the first video buffering section and the second video buffering section, a video control section configured to execute control over the other components, and a command issue section configured to send a bus input change command to the video control section as an instruction for video data selection for supply to the video signal line, the bus input change command including information about identifying a video data supply source connected over the network, the method including:

when the bus input change command is received in a state that the output from the first video buffering section is being selected by the video supply section, sending a packet transmission request to the video data supply source that is connected over the network and identified by the bus input change command, and changing the video data being received by the second video buffering section to the video data instructed by the bus input change command, and causing, after the video data stored in the second video buffering section is detected as exceeding a predetermined amount, the video supply section to select the output from the second video buffering section at an image frame or field boundary in the video data being the output from the first video buffering section, and causing the video supply section to supply the video data stored in the second video buffering section to the video signal line at the image frame or field boundary therein.

(8) A video processing apparatus, including:

a network interface;

a first video buffering section and a second video buffering section each configured to receive and store video data coming in packets over a network via the network interface;

a video supply section configured to supply a video signal to a video signal line, the video signal being a selected output from one of the first video buffering section and the second video buffering section;

a video control section configured to execute control over the other components; and a command issue section configured to send a bus input change command to the video control section as an instruction for video data selection for supply to the video signal line, the bus input change command including information about identifying a video data supply source connected over the network, the command issue section having a function of issuing the bus input change command in a sequence programmed in advance on when to execute the bus input command, the video control section being configured to identify, in a state that the output from the first video buffering section is being selected by the video supply section, which video data is to be supplied to the video signal line by the video supply section after a current time in the sequence, send a packet transmission request to the video data supply source that is connected over the network and identified by the bus input change command, and change the video data being received by the second video buffering section to the identified video data, and cause, when receiving the bus input change command instructed by the command issue section to select the identified video data, the video supply section to select the output from the second video buffering section at an image frame or field boundary in the video data being the output from the first video buffering section, and cause the video supply section to supply the identified video data stored in the second video buffering section to the video signal line at the image frame or field boundary therein.

(9) A video processing apparatus, including:

a network interface;

a first video buffering section and a second video buffering section each configured to receive and store video data coming in packets over a network via the network interface;

a video supply section configured to supply a video signal to a video signal line, the video signal being a selected output from one of the first video buffering section and the second video buffering section;

a video control section configured to execute control over the other components; and a command issue section configured to send a bus input change command with time information to the video control section as an instruction for video data selection for supply to the video signal line, the bus input change command including information about identifying a video data supply source connected over the network, the time information specifying an image frame or field for executing the bus input change, the video control section being configured to, when receiving the bus input change command in a state that the output from the first video buffering section is being selected by the video supply section, send a packet transmission request to the video data supply source that is connected over the network and identified by the bus input change command, and change the video data being received by the second video buffering section to the video data instructed by the bus input change command, and cause, after receiving a trigger for bus input change or after detecting that a time specified by the bus input change command comes, the video supply section to select the output from the second video buffering section at an image frame or field boundary in the video data being the output from the first video buffering section, and cause the video supply section to supply the video data stored in the second video buffering section to the video signal line starting from the image frame or field at a time indicated by the time information.

(10) The video processing apparatus according to (9), in which the video control section is configured to determine that the time specified by the bus input change command comes based on a time code attached to the video signal provided to the video signal line.

(11) A video processing apparatus, including:

a network interface;

a plurality of video buffering sections including a first video buffering section and a second video buffering section, the plurality of video buffering sections each being configured to receive and store video data coming in packets over a network via the network interface;

a video supply section configured to supply a video signal to a video signal line, the video signal being a selected output from any of the plurality of video buffering sections;

a video control section configured to execute control over the other components; and a command issue section configured to send a bus input change command to the video control section as an instruction for video data selection for supply to the video signal line, the bus input change command including information about identifying a video data supply source connected over the network, the video control section being configured to, when receiving the bus input change command in a state that the output from the first video buffering section is being selected by the video supply section, send a packet transmission request to the video data supply source that is connected over the network and identified by the bus input change command, and change the video data being received by the second video buffering section to the video data instructed by the bus input change command, and cause, after detecting that the video data stored in the second video buffering section exceeds a predetermined amount, the video supply section to select the output from the second video buffering section at an image frame or field boundary in the video data being the output from the first video buffering section, and cause the video supply section to supply the video data stored in the second video buffering section to the video signal line at the image frame or field boundary therein.

(12) An effect switcher, including a video processing section configured to supply video data to a predetermined video signal line, the video data being obtained over a network, the video processing section including a network interface;

a first video buffering section and a second video buffering section each configured to receive and store video data coming in packets over a network via the network interface;

a video supply section configured to supply a video signal to the video signal line, the video signal being a selected output from one of the first video buffering section and the second video buffering section;

a video control section configured to execute control over the other components; and a command issue section configured to send a bus input change command to the video control section as an instruction for video data selection for supply to the video signal line, the bus input change command including information about identifying a video data supply source connected over the network, the video control section being configured to when receiving the bus input change command in a state that the output from the first video buffering section is being selected by the video supply section, send a packet transmission request to the video data supply source that is connected over the network and identified by the bus input change command, and change the video data being received by the second video buffering section to the video data instructed by the bus input change command, and cause, when detecting that the video data stored in the second video buffering section exceeds a predetermined amount, the video supply section to select the output from the second video buffering section at an image frame or field boundary in the video data being the output from the first video buffering section, and cause the video supply section to supply the video data stored in the second video buffering section to the video signal line at the image frame or field boundary therein.

It should be understood by those skilled in the art that various modifications, combinations, sub-combinations and alterations may occur depending on design requirements and other factors insofar as they are within the scope of the appended claims or the equivalents thereof.

What is claimed is:

1. A video processing apparatus, comprising:

a first video buffer and a second video buffer that are each configured to receive and store video data received in packets over a network via a network interface;

video supply circuitry configured to supply a video signal to mixing circuitry, the video signal being a selected output from one of the first video buffer and the second video buffer;

video control circuitry configured to control the first video buffer, the second video buffer and the video supply circuitry; and command issue circuitry configured to send a bus input change command that instructs the video control circuitry to control the video supply circuitry to supply the video signal to the mixing circuitry, the bus input change command including information that identifies a video data supply source connected over the network, wherein the video control circuitry is configured to, when the video control circuitry receives the bus input change command and the video supply circuitry is in a state that the video signal is selected to output from the first video buffer, send a packet transmission request to the video data supply source that is identified by the bus input change command, control the second video buffer to receive the video data instructed by the bus input change command, send, when a change of video data instructed by the received bus input change command for supply to the video supply circuitry is completed, a notification of completion of the bus input change to the command issue circuitry, control the video supply circuitry, when detecting that the video data stored in the second video buffer exceeds a predetermined amount, to select the output from the second video buffer at an image frame or field boundary in the video data output from the first video buffer, and control the video supply circuitry to supply the video data stored in the second video buffer to the mixing circuitry at the image frame or field boundary.

2. The video processing apparatus according to claim 1, wherein the command issue circuitry is configured to indicate, when the notification of completion of bus input change is provided by the video control circuitry, that the change is completed.

3. The video processing apparatus according to claim 1, further comprising trigger input circuitry, wherein the command issue circuitry is configured to issue the bus input change command each time the command issue circuitry accepts a trigger from the trigger input circuitry in accordance with a sequence programmed in advance, and accept, after issuing the bus input change command during the sequence, the next trigger in response to receiving the notification of completion of bus input change.

4. The video processing apparatus according to claim 1, wherein the command issue circuitry is configured to issue the bus input change command in a sequence, the sequence being programmed in advance on when to execute the bus input change command, and issue, when receiving the notification of completion of bus input change after issuing the bus input change command during the sequence, another input bus change command for the sequence at a time specified by the sequence, the time being known by counting an elapsed time from an operation time, the operation time being at the completion of the change.

5. The video processing apparatus according to claim 1, further comprising a plurality of video selection circuits that each include a first video buffer, a second video buffer and video supply circuitry, wherein the video control circuitry is configured to, when the video control circuitry receives the bus input change command from the command issue circuitry and the bus input change command instructs a predetermined number of the video selection circuitry to simultaneously operate for the change of video data, control the predetermined number of video selection circuitry, at the image frame or field boundary in the video data being the output from the first video buffer, to simultaneously supply the video data stored in the second video buffer to respective mixing circuitries at the image frame or field boundary.

6. A control method for a video processing apparatus including:

a first video buffer and a second video buffer that are each configured to receive and store video data received in packets over a network via a network interface, video supply circuitry configured to supply a video signal to mixing circuitry, the video signal being a selected output from one of the first video buffer and the second video buffer, video control circuitry configured to control the first video buffer, the second video buffer and the video supply circuitry, and command issue circuitry configured to send a bus input change command that instructs the video control circuitry to control the video supply circuitry to supply the video signal to the mixing circuitry, the bus input change command including information that identifies a video data supply source connected over the network, the method comprising:

when the video control circuitry receives the bus input change command and the video supply circuitry is in a state that the video signal is selected to output from the first video buffer, sending, by the video control circuitry, a packet transmission request to the video data supply source that is identified by the bus input change command;

controlling, by the video control circuitry, the second video buffer to receive the video data instructed by the bus input change command;

sending, by the video control circuitry when a change of video data instructed by the received bus input change command for supply to the video supply circuitry is completed, a notification of completion of bus input change to the command issue circuitry;

controlling the video supply circuitry, by the video control circuitry when the video data stored in the second video buffer is detected to exceed a predetermined amount, to select the output from the second video buffer at an image frame or field boundary in the video data output from the first video buffer; and controlling, by the video control circuitry, the video supply circuitry to supply the video data stored in the second video buffer to the mixing circuitry at the image frame or field boundary.

7. A video processing apparatus, comprising:

a first video buffer and a second video buffer that are each configured to receive and store video data received in packets over a network via a network interface;

video supply circuitry configured to supply a video signal to mixing circuitry, the video signal being a selected output from one of the first video buffer and the second video buffer;

video control circuitry configured to control the first video buffer, the second video buffer and the video supply circuitry; and command issue circuitry configured to send a bus input change command that instructs the video control circuitry to control the video supply circuitry to supply the video signal to the mixing circuitry, the bus input change command including information that identifies a video data supply source connected over the network, wherein the command issue circuitry issues the bus input change command in a predetermined sequence that instructs the command issue circuitry when to execute the bus input change command, and the video control circuitry is configured to identify, when the video supply circuitry is in a state that the video signal is selected to output from the first video buffer, which video data is to next be supplied to the mixing circuitry by the video supply circuitry according to the predetermined sequence, send a packet transmission request to the video data supply source that is identified by the bus input change command, control the second video buffer to receive the identified video data, send, when a change of video data instructed by the received bus input change command for supply to the video supply circuitry is completed, a notification of completion of the bus input change to the command issue circuitry, control the video supply circuitry, when the video control circuitry receives the bus input change command that instructs to select the identified video data, to select the output from the second video buffer at an image frame or field boundary in the video data output from the first video buffer, and control the video supply circuitry to supply the identified video data stored in the second video buffer to the mixing circuitry at the image frame or field boundary.

8. A video processing apparatus, comprising:

a first video buffer and a second video buffer that are each configured to receive and store video data received in packets over a network via a network interface;

video supply circuitry configured to supply a video signal to mixing circuitry, the video signal being a selected output from one of the first video buffer and the second video buffer;

video control circuitry configured to control first video buffer, the second video buffer and the video supply circuitry; and command issue circuitry configured to send a bus input change command that instructs the video control circuitry to control the video supply circuitry to supply the video signal to the mixing circuitry, the bus input change command including information that identifies a video data supply source connected over the network and includes time information specifying an image frame or field for executing the bus input change, wherein the video control circuitry is configured to, when the video control circuitry receives the bus input change command and the video supply circuitry is in a state that the video signal is selected to output from the first video buffer, send a packet transmission request to the video data supply source that is identified by the bus input change command, control the second video buffer to receive the video data instructed by the bus input change command, send, when a change of video data instructed by the received bus input change command for supply to the video supply circuitry is completed, a notification of completion of the bus input change to the command issue circuitry, control the video supply circuitry, when receiving a trigger for bus input change or when detecting that a time specified by time information has passed has arrived, to select the output from the second video buffer at an image frame or field boundary in the video data output from the first video buffer, and control the video supply circuitry to supply the video data stored in the second video buffer to the mixing circuitry starting from the image frame or field at the time specified by the time information.

9. The video processing apparatus according to claim 8, wherein the video control circuitry is configured to determine that the time specified by the time information has arrived based on a time code attached to the video signal provided to the mixing circuitry.

10. A video processing apparatus, comprising:

a plurality of video buffers including a first video buffer and a second video buffer that are each configured to receive and store video data received in packets over a network via a network interface;

video supply circuitry configured to supply a video signal to mixing circuitry, the video signal being a selected output from any of the plurality of video buffers;

video control circuitry configured to control each video buffer of the plurality of video buffers and the video supply circuitry; and command issue circuitry configured to send a bus input change command that instructs the video control circuitry to control the video supply circuitry to supply the video signal to the mixing circuitry, the bus input change command including information that identifies a video data supply source connected over the network, wherein the video control circuitry is configured to, when the video control circuitry receives the bus input change command and the video supply circuitry is in a state that the video signal is selected to output from the first video buffer, send a packet transmission request to the video data supply source that is identified by the bus input change command, control the second video buffer to receive the video data instructed by the bus input change command, send, when a change of video data instructed by the received bus input change command for supply to the video supply circuitry is completed, a notification of completion of the bus input change, control the video supply circuitry, when detecting that the video data stored in the second video buffer exceeds a predetermined amount, to select the output from the second video buffer at an image frame or field boundary in the video data output from the first video buffer, and control the video supply circuitry to supply the video data stored in the second video buffer to the mixing circuitry at the image frame or field boundary.

11. An effect switcher, comprising:

video processing circuitry configured to supply video data to mixing circuitry, the video data being obtained over a network, the video processing circuitry including:

a first video buffer and a second video buffer that are each configured to receive and store video data received in packets over a network via a network interface;

video supply circuitry configured to supply a video signal to the mixing circuitry, the video signal being a selected output from one of the first video buffer and the second video buffer;

video control circuitry configured to control the first video buffer, the second video buffer and the video supply circuitry; and command issue circuitry configured to send a bus input change command that instructs the video control circuitry to control the video supply circuitry to supply the video signal to the mixing circuitry, the bus input change command including information that identifies a video data supply source connected over the network, wherein the video control circuitry is configured to, when the video control circuitry receives the bus input change command and the video supply circuitry is in a state that the video signal is selected to output from the first video buffer,
- send a packet transmission request to the video data supply source that is identified by the bus input change command,
- control the second video buffer to receive the video data instructed by the bus input change command,
- send, when a change of video data instructed by the received bus input change command for supply to the video supply circuitry is completed, a notification of completion of the bus input change to the command issue circuitry,
- control the video supply circuitry, when detecting that the video data stored in the second video buffer exceeds a predetermined amount, to select the output from the second video buffer at an image frame or field boundary in the video data output from the first video buffer, and
- control the video supply circuitry to supply the video data stored in the second video buffer to the mixing circuitry at the image frame or field boundary.

12. The video processing apparatus according to claim 1, further comprising the mixing circuitry, wherein
the mixing circuitry is configured to mix image frames of the video data, received from the video supply circuitry, by adding transition effects between consecutive image frames of the video images.

13. The video processing apparatus according to claim 1, wherein
the video data includes first image frames from the first video buffer and second image frames from the second video buffer, and
the first image frames are in a same phase as the second image frames.

14. The video processing apparatus according to claim 1, wherein
the notification of completion relates to a single video data supply source.

* * * * *